US009335466B2

(12) United States Patent
    Spencer

(10) Patent No.: US 9,335,466 B2
(45) Date of Patent: May 10, 2016

(54) WAVEGUIDE APPARATUSES AND METHODS

(71) Applicant: The Board of Trustees of the Leland Stanford Junior University, Palo Alto, CA (US)

(72) Inventor: James E. Spencer, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 201 days.

(21) Appl. No.: 14/109,771

(22) Filed: Dec. 17, 2013

(65) Prior Publication Data

US 2014/0178022 A1    Jun. 26, 2014

Related U.S. Application Data

(60) Provisional application No. 61/745,260, filed on Dec. 21, 2012.

(51) Int. Cl.
    *G02B 6/02*    (2006.01)

(52) U.S. Cl.
    CPC ........ *G02B 6/02042* (2013.01); *G02B 6/02328* (2013.01); *G02B 6/02347* (2013.01); *G02B 6/02352* (2013.01)

(58) Field of Classification Search
    None
    See application file for complete search history.

(56) References Cited

U.S. PATENT DOCUMENTS

| 6,134,043 | A | 10/2000 | Johnson et al. |
| 6,301,420 | B1 | 10/2001 | Greenaway et al. |
| 6,452,713 | B1 | 9/2002 | White |
| 6,539,155 | B1* | 3/2003 | Broeng ............ B29D 11/00721 385/125 |
| 6,654,522 | B2 | 11/2003 | Chandalia et al. |
| 6,801,107 | B2 | 10/2004 | Chen et al. |
| 6,845,204 | B1* | 1/2005 | Broeng ............ B29D 11/00721 385/123 |
| 7,551,819 | B2 | 6/2009 | Dangui et al. |
| 8,410,729 | B2 | 4/2013 | Campbell et al. |
| 2005/0105867 | A1* | 5/2005 | Koch, III ........... G02B 6/02338 385/125 |
| 2008/0138015 | A1* | 6/2008 | Song ..................... B82Y 20/00 385/49 |
| 2009/0072744 | A1 | 3/2009 | Botto et al. |

FOREIGN PATENT DOCUMENTS

WO    2007143473 A1    12/2007

OTHER PUBLICATIONS

B. Kuhlmey. "CUDOS MOF Utilities, User's Guide," Univ. of Sydney, Australia, NSW 2006.
C.K. Ng et al. "Transmission and Radiation of an Accelerating Mode in PBG", PRSTAB 13, 121301 (2010).

(Continued)

*Primary Examiner* — Mike Stahl
(74) *Attorney, Agent, or Firm* — Crawford Maunu PLLC

(57) ABSTRACT

Optical fiber waveguides and related approaches are implemented to facilitate communication. As may be implemented in accordance with one or more embodiments, a waveguide has a substrate including a lattice structure having a plurality of lattice regions with a dielectric constant that is different than that of the substrate, a defect in the lattice, and one or more deviations from the lattice. The defect acts with trapped transverse modes (e.g., magnetic and/or electric modes) and facilitates wave propagation along a longitudinal direction while confining the wave transversely. The deviation(s) from the lattice produces additional modes and/or coupling effects.

23 Claims, 33 Drawing Sheets

(56) References Cited

OTHER PUBLICATIONS

J. England et al., "Coupler Studies for PBG Fiber Accelerators", PAC11, New York, NY, Mar. 28, 2011.

R. Nobel and J. Spencer. "Hollow-core photonic band gap fibers for particle acceleration." Phys. Rev. ST Accel. Beams 14, 121301 (2011). Filed as Appendix of underlying provisional patent application.

M. Broxton et al. "Wave optics theory and 3-D deconvolution for the light field microscope." Optics Express 25418, Oct. 17, 2013.

B. D. Layer et al. "Ultrahigh-Intensity Optical Slow-Wave Structure." Physical Review Letters, 035001-1, Jul. 20, 2007.

A. G. York and H. M. Milchberg. "Direct Acceleration of Electrons in a Corrugated Plasma Waveguide." Physical Review Letters, 195001-1, May 16, 2008.

X. E. Lin. "Photonic band gap fiber accelerator." Physical Review Special Topics—Accelerators and Beams, vol. 4, 051301, May 31, 2001.

* cited by examiner

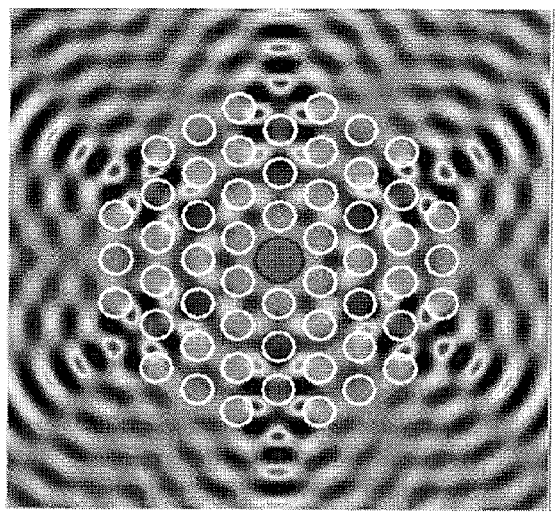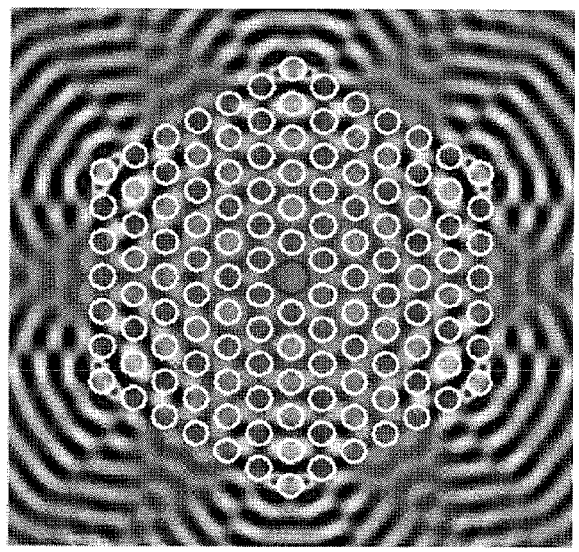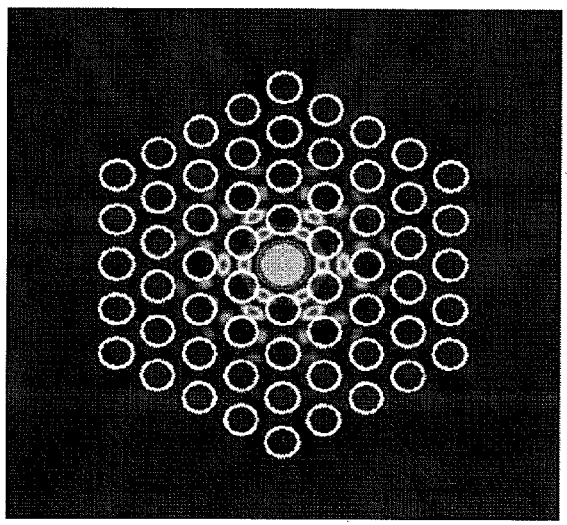
FIG. 5

WAVEGUIDE APPARATUSES AND METHODS

FEDERALLY-SPONSORED RESEARCH AND DEVELOPMENT

This invention was made with Government support under contracts DE-FG02-12ER86510 and DE-AC02-76SF00515 awarded by the Department of Energy. The U.S. Government has certain rights in the invention.

FIELD

Aspects of the present disclosure relate to apparatuses, devices, and methods involving waveguides.

BACKGROUND

Confinement of electromagnetic energy as it propagates along a fiber is useful for a variety of technologies including, but not limited to, communications, detectors, sensors and experimentation. One mechanism uses total internal reflection to confine the electromagnetic waves to the fiber. Total internal reflection can be accomplished by using materials with different kinds of refractive indices. In particular, a central portion of the fiber can be constructed out of a material with a higher index of refraction ("index") than a surrounding material (or cladding material). The electromagnetic energy is reflected at the boundary between these two materials. These and other matters have presented challenges to guiding waves, as may be implemented for a variety of applications.

SUMMARY

Various example embodiments are directed to waveguides and their implementation. Certain embodiments are directed to photonic bandgap (PBG) fibers, and more particularly to the control and use of electromagnetic modes by the introduction of inserts or breaks in the periodic structure of a PBG crystal.

In accordance with an example embodiment, an optical fiber waveguide includes a substrate having a first dielectric constant, a lattice, a longitudinally-extending defect, and a set of one or more deviations. The lattice includes a plurality of lattice regions having a second, different dielectric constant. The longitudinally-extending defect is in the lattice, and acts with trapped transverse modes including at least one of a magnetic mode and an electric mode. The defect facilitates wave propagation along the longitudinal direction while confining the wave transversely, in which a corresponding phase velocity equals the speed of light ($TM_{SOL}$). The set of deviations produce additional modes and/or coupling options for the waveguide, with the deviations having physical properties that are bounded by a figure of merit.

Another embodiment is directed to a waveguide apparatus having a substrate with a first dielectric constant, a plurality of lattice regions in the substrate, a defect region in the substrate and a deviation region. The lattice regions include holes in the substrate and have a second dielectric constant that is different than the first dielectric constant. The defect region extends in a longitudinal direction and facilitates propagation of waves using a trapped transverse mode, with the waves propagating along the longitudinal direction while being confined transversely. The deviation region includes a deviation in the lattice regions and provides an additional surface-based propagation mode for the propagation of the waves. In some implementations, the lattice regions provide a photonic crystal fiber in which modes exist in frequency passbands separated by band gaps. Waves having a frequency in one of the band gaps are confined to propagation via the defect region in the trapped transverse mode.

Another embodiment is directed to a method in which waves are propagated via a waveguide including a substrate having a first dielectric constant, and a lattice that includes a plurality of lattice regions in the substrate and having a second, different dielectric constant. Waves are propagated along a longitudinal direction and confined transversely, with a corresponding phase velocity of the speed of light ($TM_{SOL}$), using a longitudinally-extending defect in the lattice to provide trapped transverse modes. These modes include one or more of a magnetic mode and an electric mode. A set of one or more deviations from the lattice is used to produce at least one of additional modes and coupling options for the waveguide, with the deviations having physical properties that are bounded by a figure of merit. In some implementations, the set of one or more deviations from the lattice are used to produce at least one of additional modes and coupling options by producing additional modes that are predominantly surface type modes. In other implementations, data bandwidth is increased by communicating or transporting data or particles using different wavelengths of light for the surface type modes, and using different defects having different characteristics for the respective different wavelengths of light to produce additional modes.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 5 shows the effects of reducing the number of capillary rings to enhance the side coupling efficiency, consistent with embodiments of the present disclosure;

Figure 1:
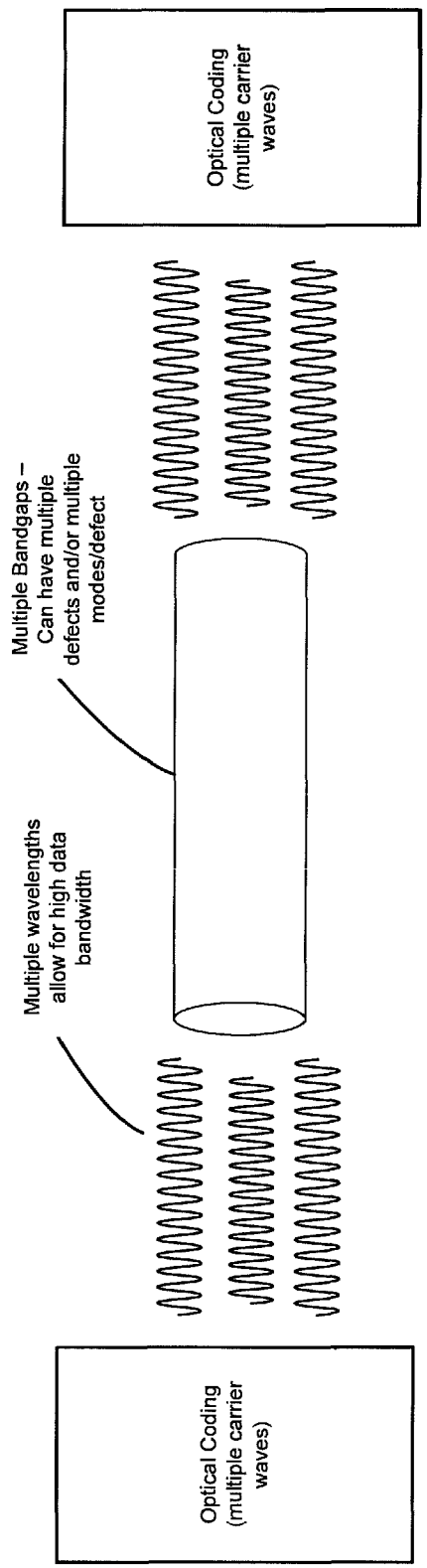
FIG. 1 shows a system diagram for providing high bandwidth communications using photonic bandgap crystals with propagating fields outside of a central defect, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving photonic bandgap (PBG) materials for accelerator structures and for communications. While not necessarily so limited, various aspects may be appreciated through a discussion of examples using this context.

Various embodiments include a fiber having a central defect surrounded by a periodic structure. The periodic structure can include an array of variations in the fiber material. These variations can run the length of the fiber ("capillaries") and have a different dielectric constant relative to the fiber material. The particular configuration for these variations helps to determine the PBG wavelengths. Consistent with various embodiments discussed herein, the PBG material can be constructed using a hexagonal array of capillaries. Other array patterns are also possible including, for example, shapes with more or less sides than a hexagon (e.g., a square).

Particular embodiments of the present disclosure are directed toward the strategic use of modification to the periodic structure. Somewhat surprisingly, it has been discovered that such modifications can be used while maintaining the confinement of the desired wavelength. This is true despite the complexity and unpredictability of assessing the effect of modifications to a fiber that is designed to take advantage of surface modes.

For accelerator structures, such as those based on TM-like modes in PBG fibers, the surface modes can be relevant to the effectiveness of the structure for use in communication or as a particle accelerator but with very different figures of merit. The PBG fibers can be subject to a variety of (manufacturing) errors that may render them less, or even completely, ineffective. Aspects of the present disclosure are directed toward methods and structures useful for facilitating rapid prototyping of variant structures to help account for such errors. Such techniques can be useful for a variety of other purposes including, but not limited to, creating matched structures for injection, extraction or beam containment insertions in accelerators. Such modifications can be useful for a wide variety of accelerators and they can all be related to the basic accelerator mode.

Transverse magnetic (TM) modes are used for particle acceleration and are so named because they have a longitudinal electric field on the accelerator axis and no longitudinal magnetic field on axis. To achieve particle acceleration in the absence of conducting boundaries, a dielectric structure must be designed to: support a TM mode with a uniform longitudinal electric field, slow the accelerating wave's phase velocity to be synchronous with the relativistic particle (v_c), and confine the field energy near the particle beam. The refractive index of dielectrics like (SiO2) is greater than one and will naturally reduce the wave phase velocity $v_p = c/n_{eff} = \omega/k_z$. Here c is the speed of light, $n_{eff}$ is the mode's effective index, $k_z$ is the propagation constant (wave number) in the material, $\omega = ck_0 = 2\pi c/\lambda$ is the frequency, and $\lambda$ is the freespace wavelength. Silica is highly resistant to radiation damage, has a damage threshold of about 2 GV/m for picosecond pulse lengths, and is highly transmissive from about 0.2 to 2 μm and above, making this the natural wavelength range for an optical particle accelerator.

Consistent with embodiments of the present disclosure, field confinement without metal boundaries can be achieved by optical interference through the creation of a dielectric structure arranged in aperiodic geometry (e.g., a photonic crystal). Solutions to the Maxwell equations in aperiodic system exhibit the symmetry of the periodic array, and allowed modes are those which scatter coherently from the distributed inclusions. Light waves travel as Bloch waves, characterized as a product of a periodic function and a plane wave with characteristic wave vector. These Bloch waves have a dispersion relation similar to free photons, but modified by the Fourier components of the variation of the dielectric structure, particularly near the Brillouin zone boundaries (given by half of the unit reciprocal lattice vectors). This results in frequency passbands and stop bands, or photonic bandgaps, through constructive and destructive interference. The frequencies in the bandgap correspond to modes with periodicity unmatched to the lattice and unable to propagate. The photonic bandgap (PBG) structure acts like a perfectly reflecting mirror at these frequencies. Trapped modes, also referred to as defect modes in optics terminology, can be obtained by breaking the symmetry with the introduction of a defect into the lattice. These modes cannot propagate in the crystal and are spatially confined to the defect, becoming evanescent in the extended crystal.

As used herein, the discussed insertions can relate to techniques for producing or modifying thin wafers of PBG crystals. These thin wafers can be used in separate ways, such as: 1) to achieve basic design goals, e.g., to optimize a design, 2) to make a design better, e.g., by integrating previously disparate or independent elements into the overall system and 3) to develop capabilities beyond the original design goals or to implement very significant improvements, as well as for rapid prototyping of variant structures to test new ideas such as the tolerance of the basic design to errors or perturbations such as aperiodic inclusions in a lattice.

For example, it is useful to be able to effectively drill or etch a new capillary or to change the size or shape of an existing capillary. To demonstrate the generality of this to other modes and applications, one can increase the throughput or bandwidth of a PBG crystal by developing an array of defects either by increasing the number of single defect lattices in a wafer or increasing the number of defects in a single lattice and/or by increasing the number of usable bandgaps in a single defect lattice or any combination of these. In certain instances, it can be useful to reduce the size of a capillary, e.g., via a coating technique such as CVD. The ability to effect changes to the lattice can be complicated by the effects of the complex geometry of the refractive index n(x,y,z) of these PBG fibers. For example, one implication is that there are no exact global solutions for their modal fields. Thus, the term "TM01-like" represents the lack of an exact solution. This complicates attempts to couple into fibers for such modes and also presents associated problems with efficiency. Somewhat surprisingly, the present disclosure presents modifications to basic PBG lattices that can be useful for improving characteristics of the fiber, such as aperiodic inclusions. The discussion of these modifications sometimes assumes cylindrical symmetry for simplicity of presentation and calculation because they do not vary with distance z along the fiber; however, the present disclosure is not necessarily so limited. For instance, the modifications can include twists under certain constraints which allow the fields to be expressed in separable form (transverse and longitudinal). This is the basis of many of the calculations shown, e.g., with the CUDOS code. Thus, having an approximate numerical solution, perturbations can be applied in a variety of ways to obtain and to understand many important results without doing damage to their generality.

Various embodiments are directed toward the addition of either periodic or non-periodic inclusions in the form of capillaries and/or defects into the basic photonic crystal lattice. Of particular interest are additional defects disposed in an alternative symmetry to that of the original lattice. Somewhat surprisingly, capillary inclusions can enhance the accelerating gradient in accelerator applications considerably through eliminating hot spots in the material of the lattice. Other modifications relate to the inverse effect of changing the index of a capillary or even eliminating it by filling it with the same or different material. This can be useful for incorporating lasers or, for example, to shift the phase between the particle and laser beams in an accelerator application.

Other possibilities include ways to manipulate such insertions in a dynamic way, e.g., via the equivalent of a cassette exchanger or possibly a mechanism for rotating them where a Geneva mechanism could be used to make accurate, discrete angular steps. Similarly, it is useful to be able to effectively drill or etch a capillary to change its size or shape.

Relative to other modes and applications, the throughput or bandwidth of a PBG crystal can be increased by developing an array of defects by increasing the number of single defect lattices in a wafer or by increasing the number of defects in a single lattice and/or by increasing the number of usable bandgaps in a single defect lattice or any combination of these.

Another mechanism uses photonic bandgap (PBG) structures/fibers to confine propagating electromagnetic energy to the fiber. For instance, a fiber can be constructed with a periodic structure that exhibits a photonic bandgap over an extended wavelength range. A central defect in the periodic structure can facilitate the propagation of electromagnetic energy at the desired wavelength, while the surrounding PBG structure confines the electromagnetic energy to the central defect.

As discussed herein, fibers and devices can be constructed to make use of defect/surface modes that are not confined to the central defect. These modes can be particularly useful for contributing to the performance of the PBG fiber and associated application, whether the application relates to data communications or particle acceleration.

Because of electrical breakdown of metals in the presence of high electric fields, particle accelerators that use metal cavities driven by high-power microwaves operate with accelerating fields of 20 to 40 megavolts per meter (MV/m). Charged particle devices can be large and expensive due to the accelerator length and total stored energy needed to achieve high energy. Size and cost reductions are required for many applications. By comparison, the maximum surface fields of dielectric materials exposed to pulsed laser light are fluence limited to the order of a joule/cm2 below two picosecond pulse lengths and are expected to exceed 10E9 volts/meter (gigavolt/meter (GV/m)). These fields are an order of magnitude above metallic structures, making a laser-powered, dielectric waveguide, and are implemented for particle acceleration, in accordance with one or more embodiments.

In accordance with another example embodiment, an optical fiber waveguide includes a substrate having a lattice with a plurality of lattice regions, in which the lattice regions and the substrate have different dielectric constants. In some implementations, the lattice regions include capillaries extending longitudinally. A longitudinally-extending defect in the lattice acts with trapped transverse modes including at least one of a magnetic mode and an electric mode. The defect facilitates wave propagation along the longitudinal direction while confining the wave transversely, in which a corresponding phase velocity equals the speed of light ($TM_{SOL}$). One or more deviations from the lattice produce additional modes (e.g., predominantly surface-type modes) and/or coupling options for the waveguide, with the deviations having physical properties that are bounded by a figure of merit. Such a figure of merit may include, for example, one or more of a radius of the defect, a radius of the lattice regions, a lattice spacing between the lattice regions, a damage factor (DF), lattice symmetry, Poynting flux loss (a) and wave dispersion.

The deviations from the lattice are implemented using one or more of a variety of approaches. In some embodiments, the additional modes increase bandwidth by communicating or transporting data or particles using different wavelengths of light via the additional surface type modes. In some implementations, different wavelengths of light reside (e.g., are propagated) in different defects. In certain embodiments, the deviations include one or more of: additional regions having a different dielectric constant than the substrate's dielectric constant and extend longitudinally; relative size variations in the lattice regions; different spacing between the lattice regions; one or more of the lattice regions having a dielectric constant that is different than the dielectric constants of both the substrate and the lattice regions; and deviations that increase the transmission of power via the defect for at least one of optical and particle transmission.

In various embodiments, the deviations include additional lattice regions extending longitudinally, having a dielectric constant that is different than the substrate's dielectric constant, and that reduce hotspots in the substrate. In some implementations, the additional lattice regions include dielectric material that have a higher breakdown field than the substrate and that act both as a strong field attractor and as an enhancer of the figure of merit.

The waveguide as discussed herein is implemented in a variety of manners to suit different embodiments. In some embodiments, the waveguide operates as an accelerator and/or a transport channel in which a phase velocity of a propagating wave therein equals the speed of light. In certain embodiments, the defect is sized to provide a trapped transverse magnetic-like mode in a bandgap by way of a dispersion relation that crosses a line that corresponds to a phase velocity equaling the speed of light.

FIG. 1 shows a system diagram for providing high bandwidth communications using photonic bandgap crystals with propagating fields outside of a central defect, consistent with embodiments of the present disclosure. As discussed in more detail herein, a photonic bandgap crystal can be used to transmit data using multiple different carrier frequencies. This ability can be realized by introducing inserts or breaks in the periodic structure of a photonic bandgap crystal. This can facilitate the use of bundled photonic bandgap crystals that are designed with different bandgaps for corresponding carrier frequencies. In some embodiments, a single crystal structure surrounding a central defect can be designed to have multiple modes thereby facilitating the use of multiple carrier frequencies.

Figure 2:
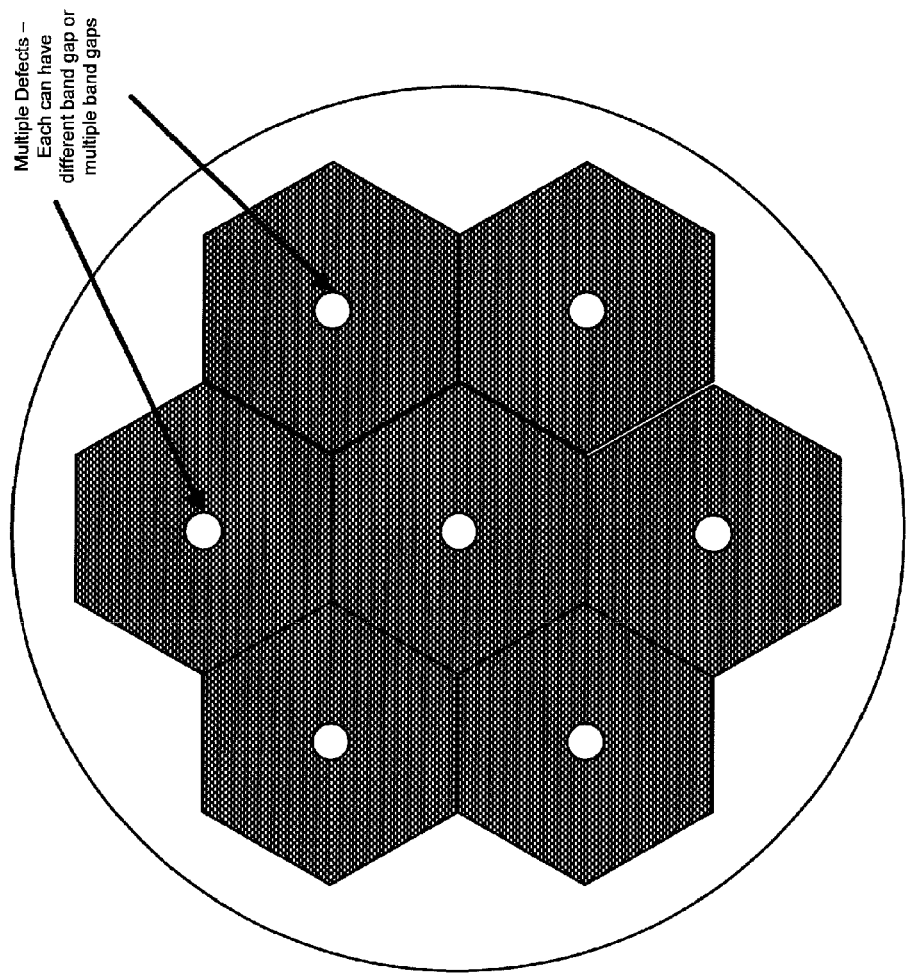
FIG. 2 shows a cross section of a photonic bandgap fiber bundle with multiple central defect regions, consistent with embodiments of the present disclosure.

FIG. 2 shows a cross section of a photonic bandgap fiber bundle with multiple central defect regions, consistent with embodiments of the present disclosure, in which each central defect and corresponding periodic structure can be designed independently. This can include enlarging one or more of the capillaries surrounding the central defect. The capillaries can also be reduced in size and/or filled with a different material. Further possible modifications include changing the spacing between capillaries and/or adding new capillaries. These modifications can be used alone or in combination and are not necessarily limiting.

As discussed in more detail herein, limitations on the extent and type of modifications can be defined according to a relevant figure of merit. A particular figure of merit is the damage factor (DF). Other figures of merit can also be used for assessing the viability of the modifications.

Figure 3:
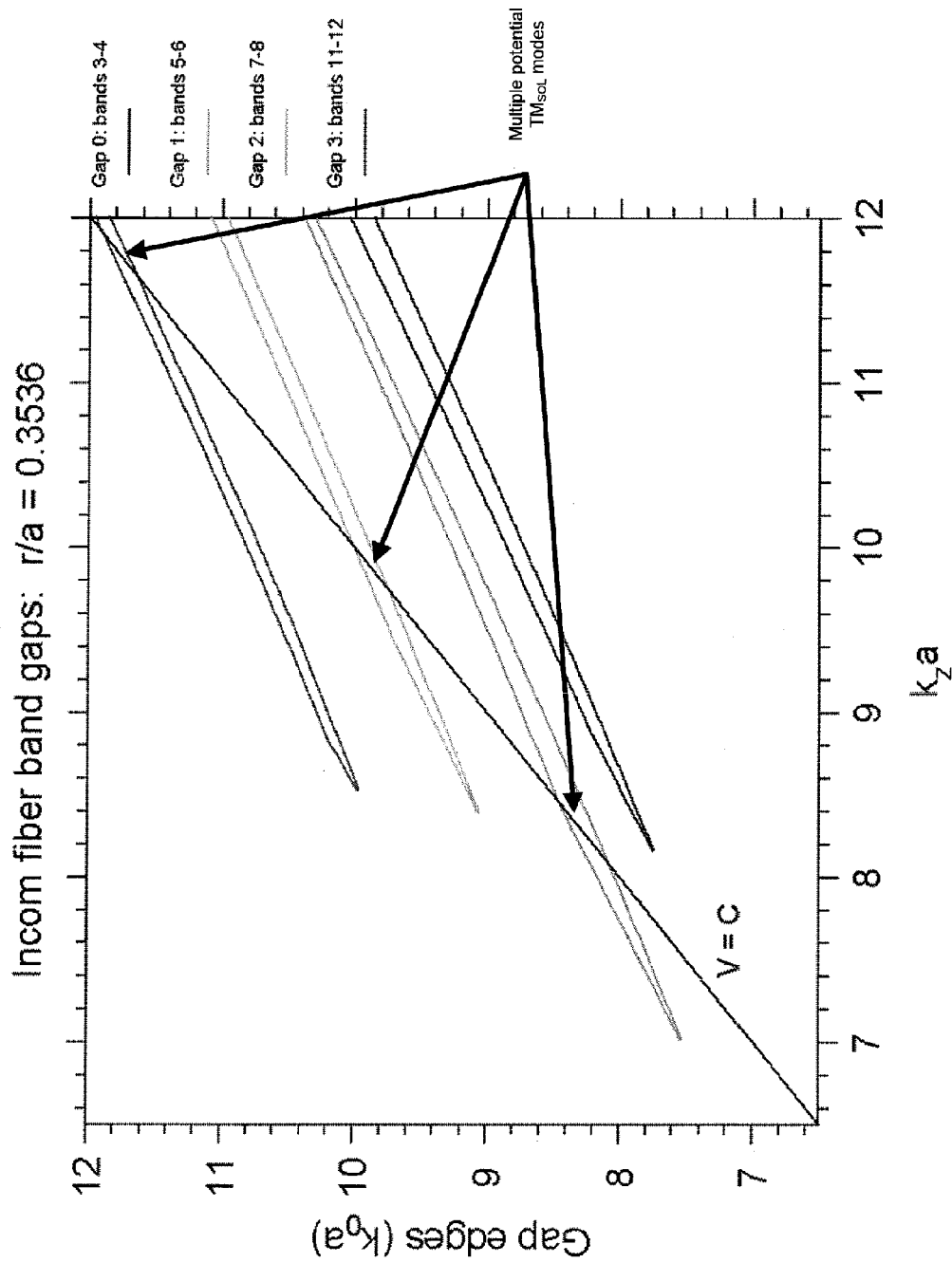
FIG. 3 shows a graph of bandgaps of an experimental photonic bandgap fiber as related to speed of light (SOL) modes, consistent with embodiments of the present disclosure.

FIG. 3 shows a graph of bandgaps of an experimental photonic bandgap fiber as related to speed of light (SOL) modes, consistent with embodiments of the present disclosure. The experimental photonic bandgap fiber is consistent with various experimental disclosures discussed in more detail herein, and by way of example refers to an ET3509 fiber structure. One mode comes very close to the speed-of-light line in the center of the bandgap in the lowest bandgap here that intersects the light line near $k_o a=8.17$. Other gaps of interest to study are those centered near 9.84 and 11.78. These lie in the range of Ti:Sa and He:Ne lasers when the lattice period is adjusted to allow the use of a Nd:YAG laser for the lowest bandgap at 8.17.

Figure 4:
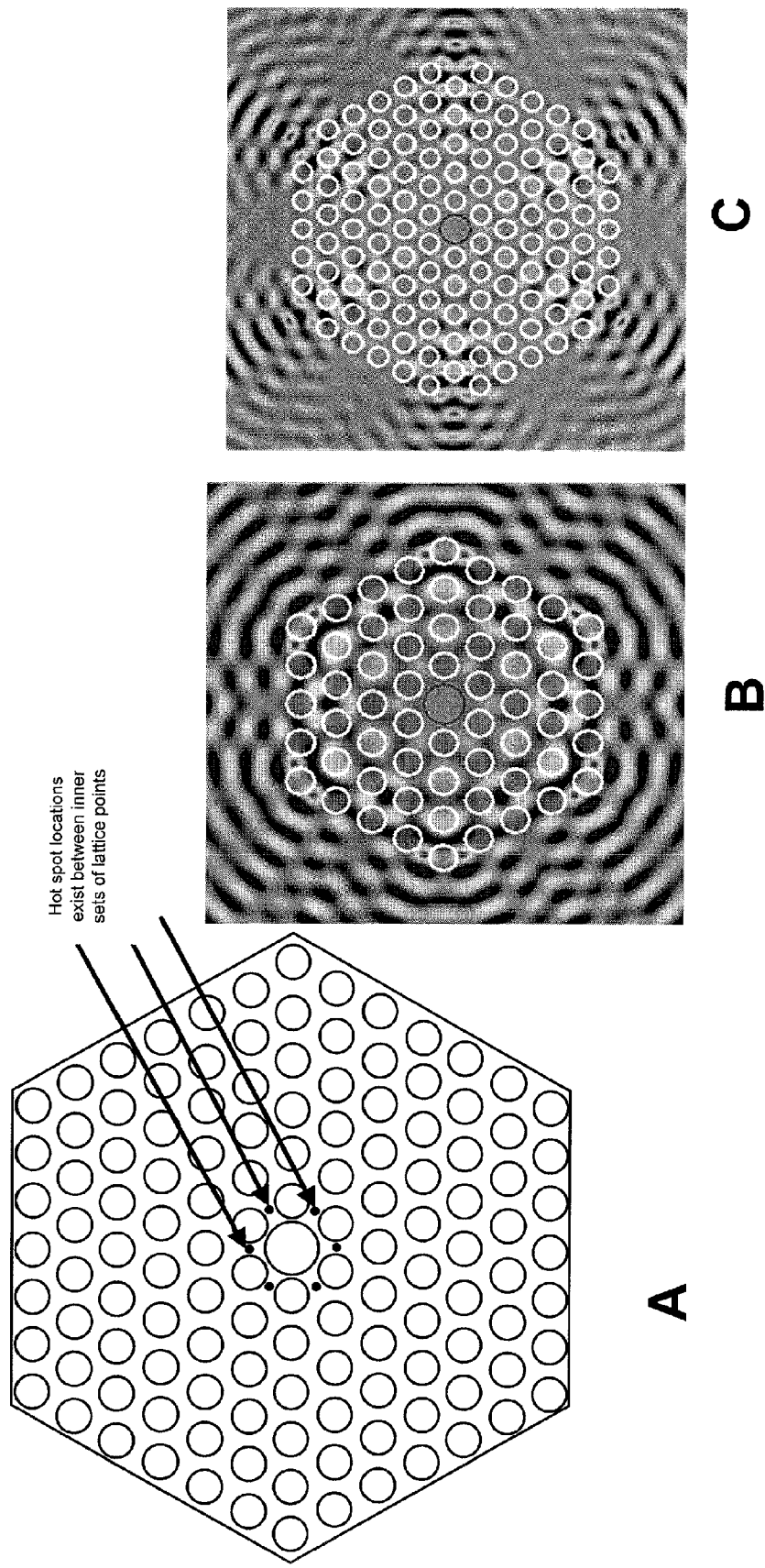
FIG. 4 shows a cross section of a photonic bandgap fiber with a central defect that is subject to hotspots, consistent with embodiments of the present disclosure.

FIG. 4 shows a cross section of a photonic bandgap fiber with a central defect that is subject to hotspots, consistent with embodiments of the present disclosure. These hotspots represent points at which the DF value can be assessed. As discussed in more detail herein, various modifications can be undertaken to lessen the impact of such hotspots. FIG. 5 shows an example of the disposition of hotspots.

Figure 6:
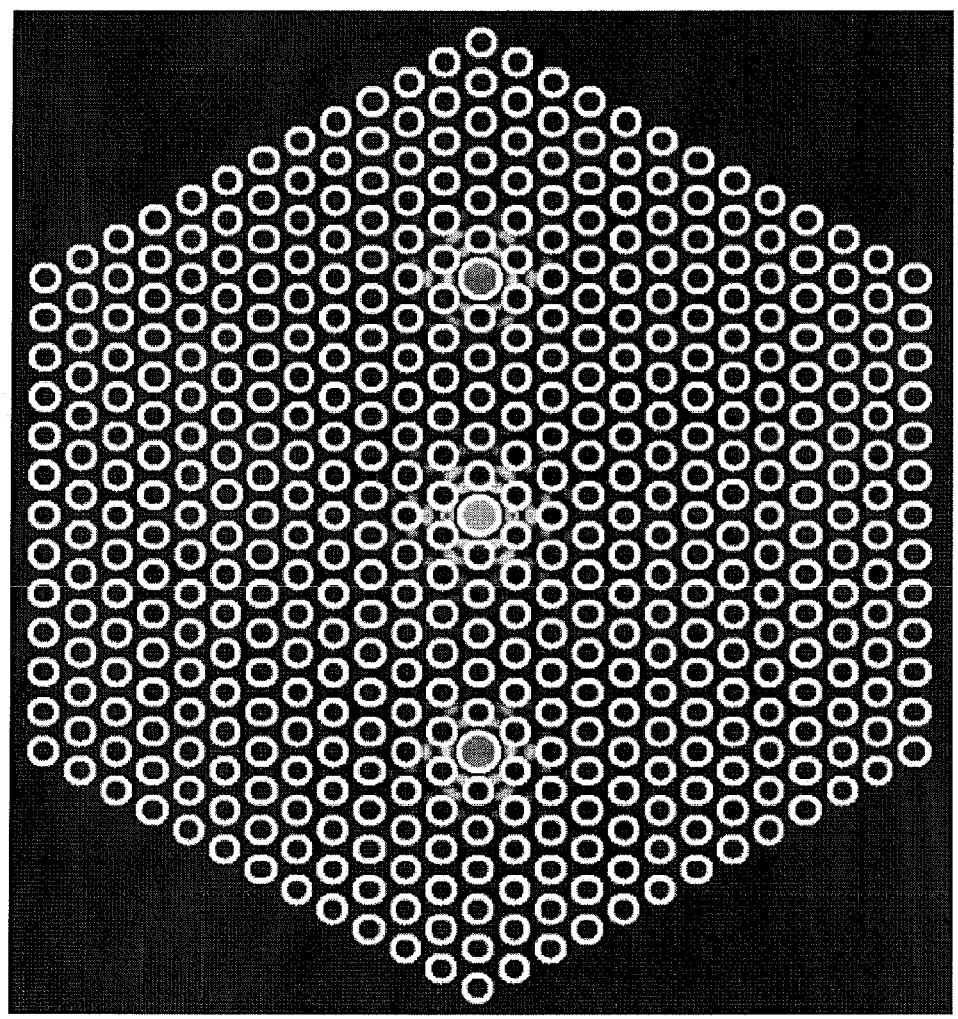
FIG. 6 shows a new mode whose local distributions closely parallel those shown in FIG. 5 and those shown in FIGS. 30A-B, consistent with embodiments of the present disclosure.
Figure 7:
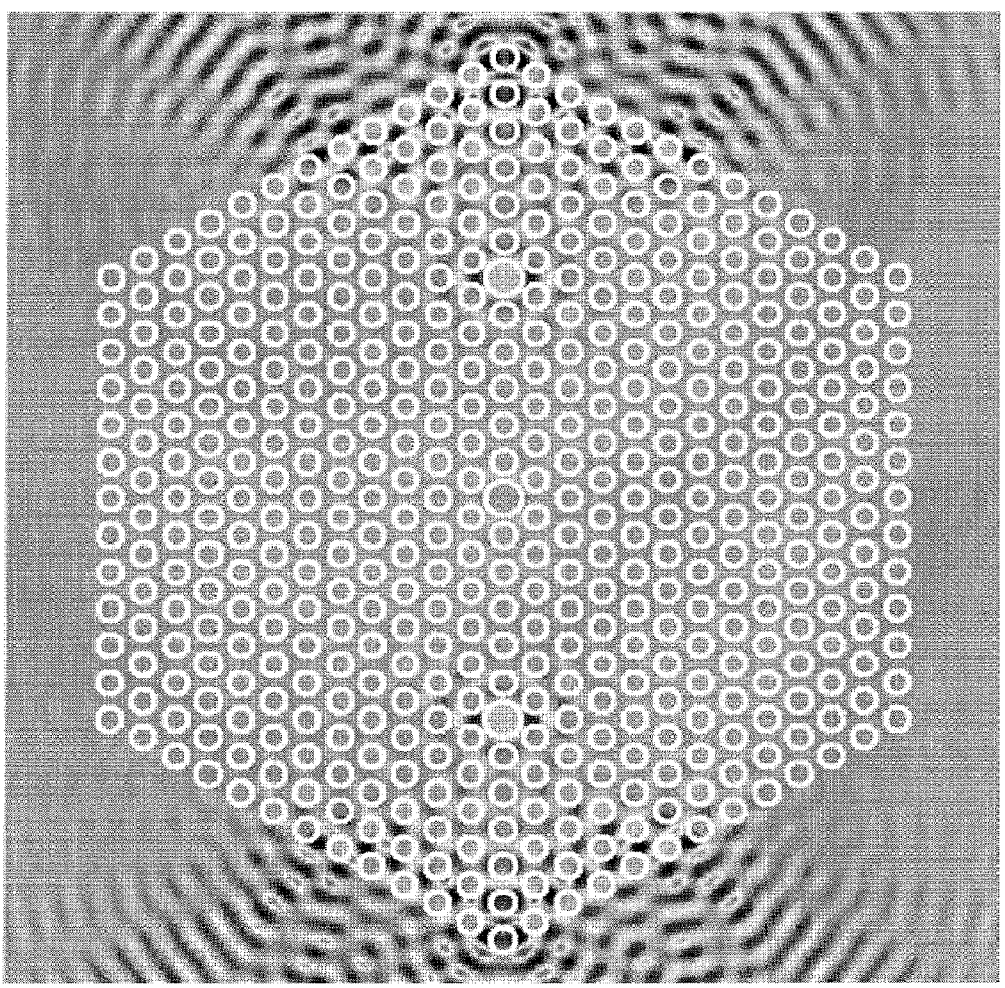
FIG. 7 shows the $Re[E_z]$ dominated by the constructive interference between the radiative losses from the three defects excited by the same longitudinal accelerating mode, consistent with embodiments of the present disclosure.

As discussed in more detail herein, both end and side coupling can be dominated by the basic crystal symmetry, but this can be broken by imposing a minor array of defects such as shown in FIG. 6. FIG. 6 shows a new mode whose local distributions closely parallel those shown in the previous Figure and those shown in FIGS. 30A-B, consistent with discussions herein. FIG. 7 shows the Re[$E_z$] dominated by the constructive interference between the radiative losses from the three defects excited by the same longitudinal accelerating mode as in FIGS. 30A-B. The radiation pattern no longer has a hexagonal symmetry; the perturbations shown above can improve this by removing the two vertex capillaries and adding external rings.

New types of accelerator structures such as those based on TM modes in photonic bandgap (PBG) crystals rely on modern technology for their production and can be expected to have a variety of errors that may render them ineffective before the final production process is fully debugged. Even when processes are debugged, they are seldom optimal so that modifications to the as-built structures are often useful. While essential in some form for rapid prototyping of variant structures, such techniques are useful for many other purposes, e.g., to make matched structures for injection or extraction or beam containment insertions. Such insertions are extremely important for any practically usable accelerator and they are all closely related to the basic mode of the accelerator.

Aspects of the present disclosure are directed toward a wide variety of PBG crystals. Particular aspects are directed toward applications using surface modes as opposed to the so-called core modes familiar in the telecom field where much of the work and study on PBG crystals has been focused. Further, due to the very different and much simpler character of those modes none of these techniques seem necessary, but can provide some very real benefits.

Insertions make possible an integrally new system so these techniques are useful in at least three or more separate ways: 1) to achieve basic design goals, e.g., to optimize a design, 2) to make a design better, e.g., by integrating previously disparate or independent elements into the overall system and 3) to develop totally new capabilities beyond the original design goals or to implement very significant improvements to it, as well as for rapid prototyping of variant structures to test new ideas such as the tolerance of the basic design to aperiodic inclusions.

Before providing a few illustrative examples of insertions and some techniques to produce them, it is useful to comment on the effects of the complex geometry of the refractive index $n(x,y,z)$ of these PBG fibers. For example, one implication is that there are no exact global solutions for their modal fields which explains the use of the term "TM01-like." This also helps to explain why so little has been done on the coupling problem for such modes into these fibers and the associated questions of efficiency. Many modifications to the basic PBG lattices of interest here that improve certain characteristics of the fiber, such as aperiodic inclusions, assume cylindrical symmetry for simplicity of presentation because they do not vary with distance z along the fiber. Note that this does not exclude twists under certain constraints and this allows the fields to be expressed in separable (transverse and longitudinal) form. This is the basis of many of the calculations shown here, e.g., with the CUDOS code (B. Kuhlmey, "*CUDOS Utilities for Micro-Structured Optical Fibers*," Univ. of Sydney, Australia., which is fully incorporated herein by reference). Thus, with an approximate numerical solution, perturbations can be made in a variety of ways to obtain and to understand many important results without doing damage to their generality.

Examples of techniques and how they apply to each of these items include the addition of either periodic or non-periodic inclusions in the form of capillaries and/or defects in the basic photonic crystal lattice. Of particular interest are additional defects disposed in an alternative symmetry to that of the original lattice. We have shown that capillary inclusions can enhance the accelerating gradient considerably through eliminating hot spots in the material of the lattice. Other techniques address the inverse effect of changing the index of a capillary or effectively eliminating it by filling it with the same or different material than the lattice. This can be effective in shifting the phase between particle and laser beams as particles are accelerated.

Similarly, it is useful to be able to effectively drill or etch a capillary to change its size or shape. To demonstrate the generality of this to other modes and applications, one can increase the throughput or bandwidth of a PBG crystal by developing an array of defects. For instance, the number of single defect lattices in a wafer may be increased, the number of defects in a single lattice may be increased, the number of usable bandgaps in a single defect lattice may be increased, or two or more of these approaches may be employed together. In some instances, a capillary size can be enlarged (e.g., by drilling or etching) or reduced (e.g., by coating techniques).

Aspects of the present disclosure are directed toward the use of using dry, fused quartz or pure silica as well as other possible techniques to optimize the damage factor (DF) for these PBG crystals based on what one can take as their primary Figure-of-Merit (FoM) that is discussed in more detail. Various aspects relate to the effects of crystal symmetry and its perturbations or breaking to achieve or optimize various goals—including an improved DF. Of particular interest are the effects of symmetry perturbation, breaking and mixing, e.g., between distinctly different symmetry types when they coexist in the same PBG crystal and especially when they share capillaries in common. Non-limiting examples are provided for perturbations of interest for a matrix accelerator showing the viability of this idea when the basic symmetry is only perturbed. This provides a better understanding of this type of accelerator, how it can operate and, a chance to observe and determine viability. Various calculations are provided for mode characteristics and for the type and size of crystal that can be used. The use of filler materials in certain capillaries is studied in some detail, e.g., showing it has the effect of emphasizing a defect so that it acts very much as though it is a strong attractor for the fields. The conditions for this are discussed as well.

Figure 8:
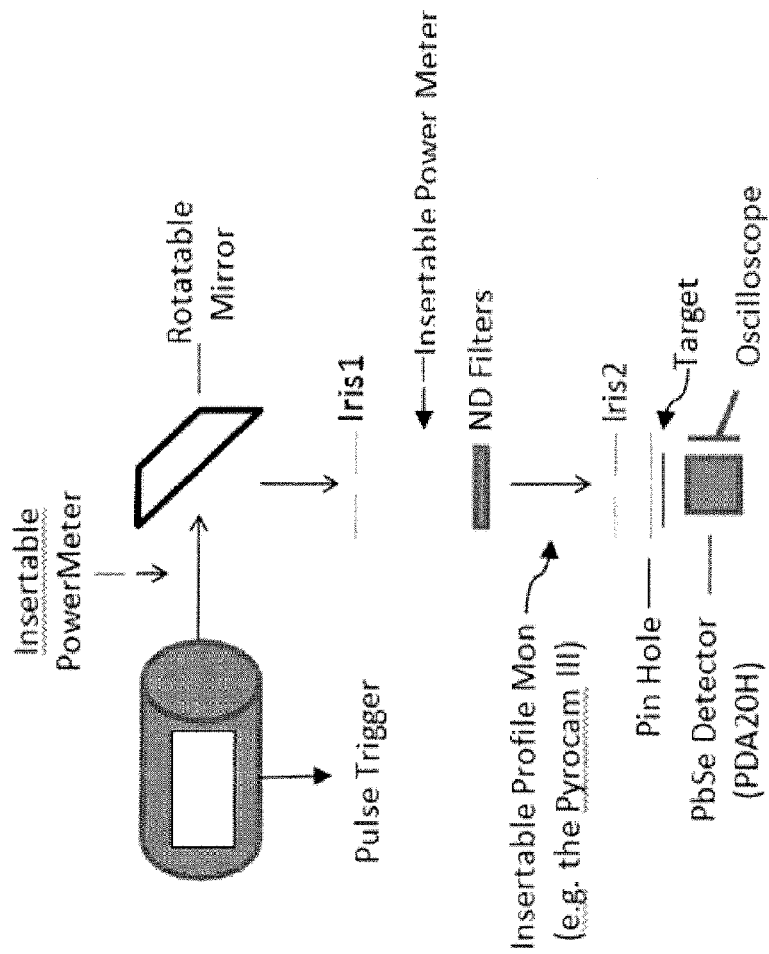
FIG. 8 shows a test setup used to obtain the following transmission data on three samples, consistent with embodiments of the present disclosure.

FIG. 8 shows a test setup used to obtain the following transmission data on three samples: PBG crystals ET3509 and ET3516 and a glass slide of comparable thickness made from the same capillary glass that was used for the crystals. This setup can be varied in several ways to accommodate a variety of targets from a small cross-sectional area to large or from thick or thin samples where the main limitations come not from the bandwidth of the PbSe detector (at least 1-4.5 μm), but from its sensitive area which is only 2×2 mm. Because of this limitation the incident beam size was limited to the target which is attached to a circular collimator having a 3.5 mm OD.

Figure 9:
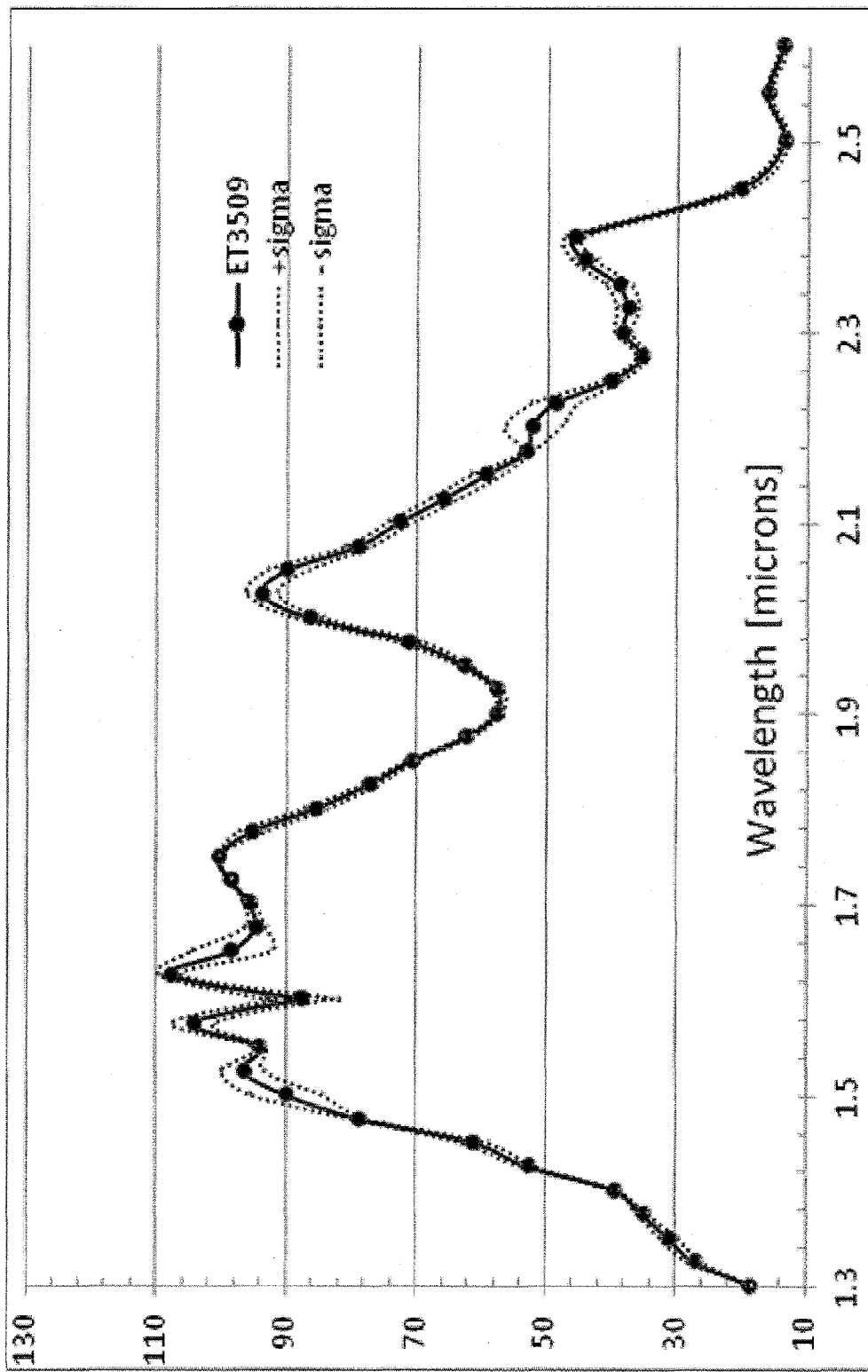
FIG. 9 shows a plot of un-normalized transmission data taken in 25 nm steps on a wafer having included defects, consistent with embodiments of the present disclosure.

FIG. 9 shows a plot of un-normalized transmission data taken in 25 nm steps (typical) on the Incom wafer ET3509 having included defects. The OPA was setup to provide a small focal spot on the crystal that was less than the size of a single-defect hexagonal lattice having eleven rings. The dotted lines show the one sigma, statistical error bars.

Figure 10:
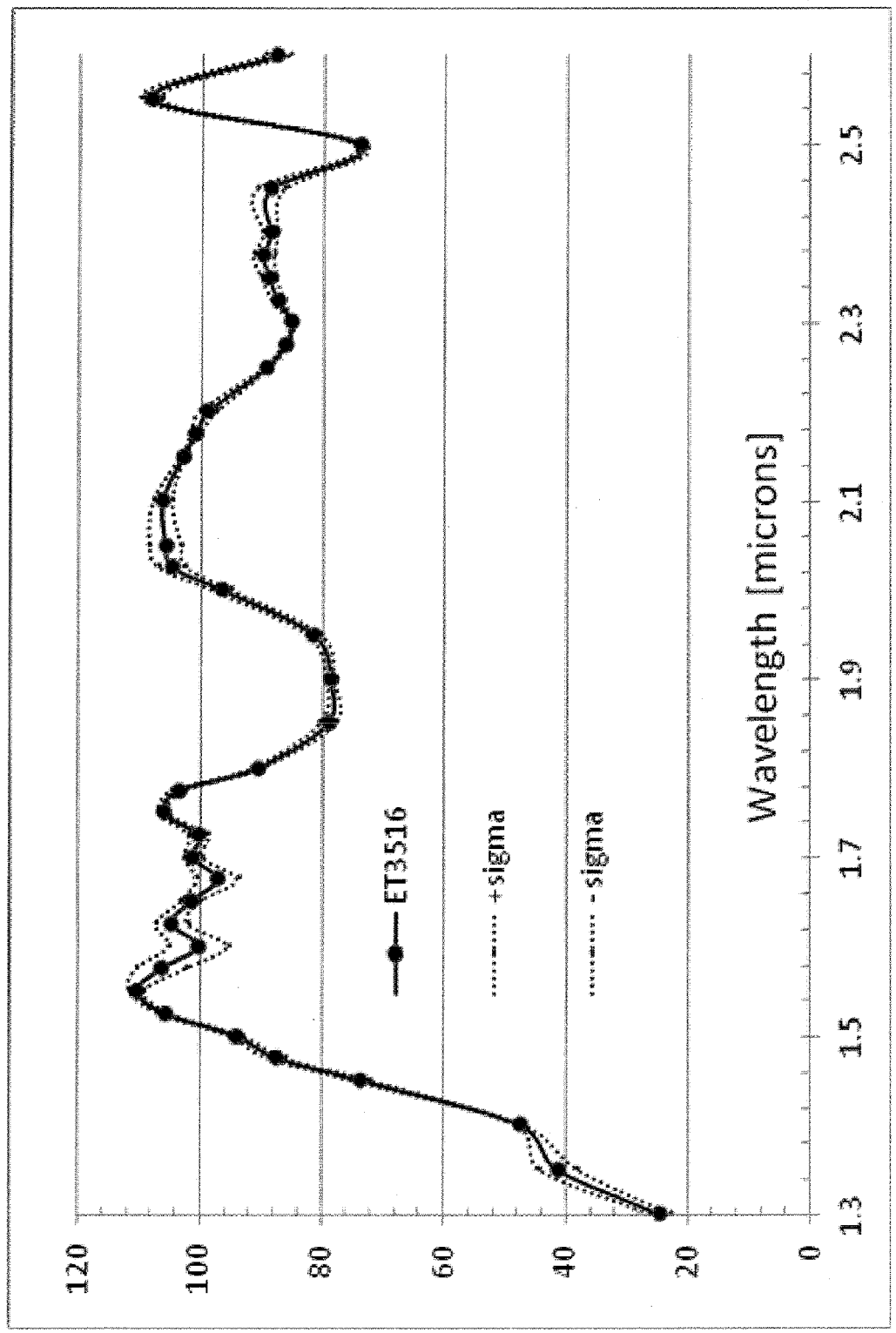
FIG. 10 shows another plot of un-normalized transmission data taken in 25 nm steps on a wafer having no included defects, consistent with embodiments of the present disclosure.

FIG. 10 shows a plot of un-normalized transmission data taken in 25 nm steps (typical) on an Incom PBG wafer ET3516. This PBG wafer has similar characteristic dimensions to ET3509, but has no included defects. The OPA was setup to provide a "small" focal spot on the crystal that was less than the basic single defect hexagonal lattice with eleven rings. The dotted lines give the one sigma, statistical error bars. The structure observed around 1.4, 1.65, 1.9, 2.3 and 2.5 microns will be discussed later.

In contrast to the previous case (wafer ET3509), the only characteristic dimension or aperture in this lattice is the capillary radius ($r=1.46$ μm was measured for ET3509).

Figure 11:
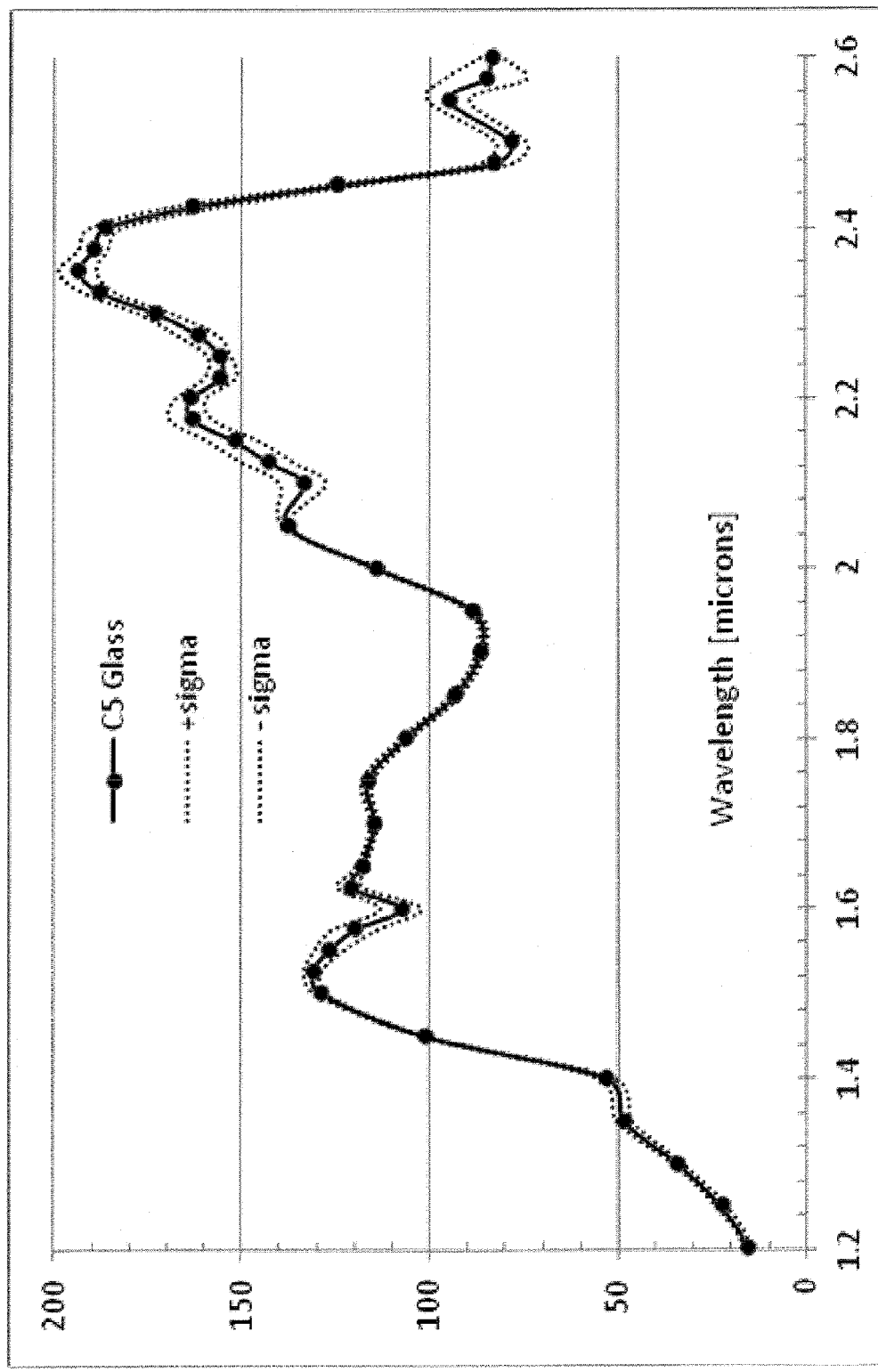
FIG. 11 shows a plot of un-normalized transmission data for a glass slide made of the same glass as used for the capillaries in FIGS. 9-10, consistent with embodiments of the present disclosure.

FIG. 11 shows a plot of un-normalized transmission data for a glass slide made from the same glass that was used for the ET series of Incom wafers. This data was taken in 25 nm steps (typical) with the OPA. It shows a distinctly different spectrum with structure at wavelengths near 1.4, 1.6, 1.9, 2.1, 2.24 and 2.5 microns where the additional structure evident at 2.1 microns was not as obvious in the previous data for the crystals. Notice, however, that the regions near 1.6 and 2.1 microns were crossover points for the OPA, e.g., between the signal and idler.

This amount of structure in an unstructured glass slide seems surprising especially since the samples were kept in a portable desiccator the whole time except when in use. This provides another argument for using dry fused quartz or silica that is as free of contaminants as practicable. The reasons for this are especially clear in this example because the excitations of some of these "dopants" (contaminants) in the glass line up with some of the bandgaps in the crystals. This makes it necessary but difficult to unfold the two even when the contaminants come from known water groups with their well-known lines. Further, there is no guarantee that these or their effects are the same in the two samples because of their very different fabrication methods. At the same time, the many binary and ternary molecules such as BO and OH that are comparatively light and thereby lower the temperatures of many phase transitions make "bad" glass good by making it easier to work.

Further, there are questions of capillary or tubing availability and its costs including the draw tower required. Nonetheless, one needs to remember how these same characteristics contribute to radiation damage in such crystals. Thus, while there are the inevitable trade-offs, it is also safe to say that this has proven to be a good prototyping material with cost advantages, but very serious limitations for some applications. The next figure shows the problems encountered when trying to separate the different contributions to each resonance.

Figure 12:
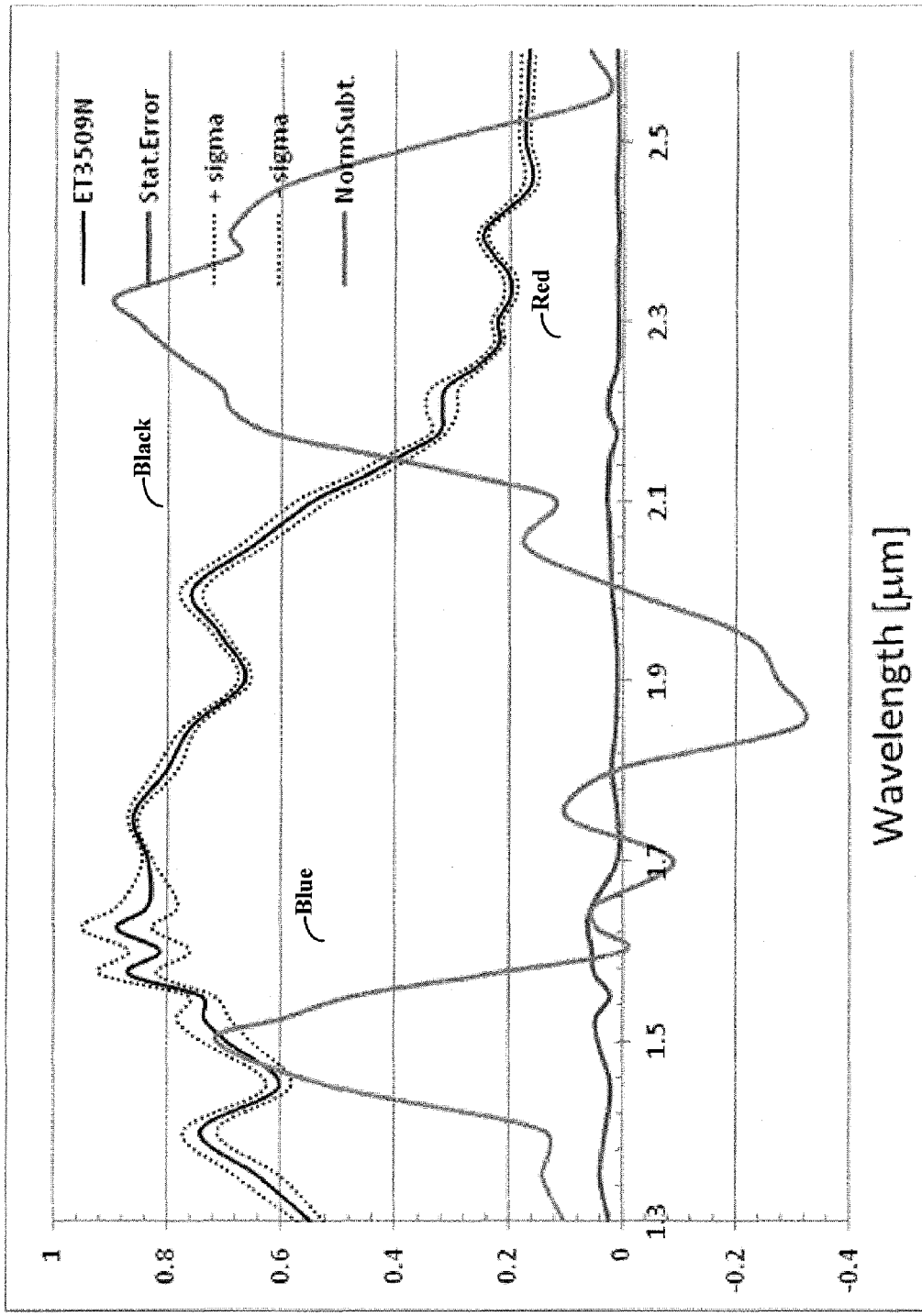
FIG. 12 shows a plot of the normalized data for the ET3509 wafer, consistent with embodiments of the present disclosure.

FIG. 12 shows a plot of the normalized data for the ET3509 wafer, the first plot (black lines) of this sequence, is normalized by the data for the glass slide just shown. The transmission for the slide is about 90% based on our FTIR data over most of this range. It appears that we need to normalize these two sets of data individually, e.g., near 1.7 or 2.4 µm and then subtract them to unfold the bandgap strengths in the ET3509 and ET3516 wafers. The red line is the combined error for ET3509N and the blue is for the subtraction of the two data sets after normalizing them at 1.7 µm. It is interesting to compare the resonance lines now, e.g., at 1.39, 1.6, 1.7, 1.9, 2.1, 2.22, 2.38 and 2.56 microns. Also, one can argue there are 2 lines near 1.3 and 1.9 microns. These may come from different nearly degenerate sources.

It has been shown that there was radiation damage induced when ET3133 was used as a collimator—even under very low doses. This was observed visually as darkening in the crystal at visible wavelengths and it was shown to be even worse in the NIR and MIR using the FTIR. Together with the data above this suggests that better glass such as dry fused silica would be beneficial. These are some of the new results that have been demonstrated here (and not simply surmised) during this Phase 2 study. It appears to be a valid application to use such good (patterned) glass as protective collimating inserts or reticles in conjunction with any of the more expensive components to fabricate or to test, especially the accelerating "cavities." Further, these components themselves should be fabricated using fused quartz or silica.

In the next set of figures a transition is made to study the ET3861 crystal and to explore the etching of such structures for various purposes, e.g., to modify small errors in the fabricated lattices in order to optimize them.

Figure 13:
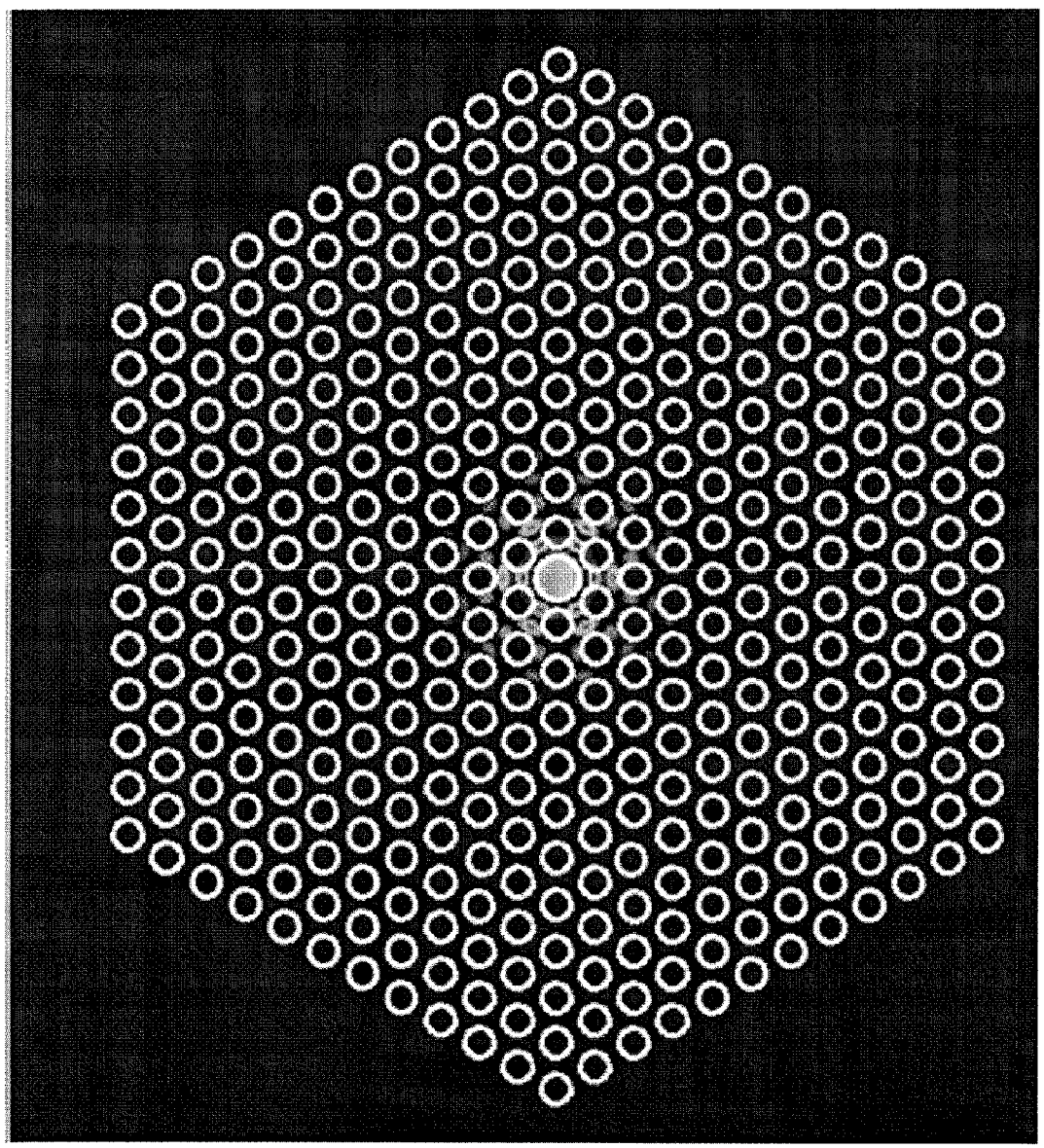
FIG. 13 shows a basic lattice, consistent with embodiments of the present disclosure.

FIG. 13 shows a basic lattice on which the subsequent calculations for the ET3861 crystal were based. It has a good accelerating mode with a good damage factor DF=0.492 and most of the characteristics desired for an accelerator lattice. As the structure was successively modified, some interesting changes are observed, e.g., the good central mode is lost because of the breaking of the basic hexagonal symmetry of the lattice and the subsequent coupling to new modes. In this case, the index of refraction (RI) is n=1.003676+4.8173E-6(i) and the wavelength of the mode is $\lambda$=1.995 µm.

Figure 14:
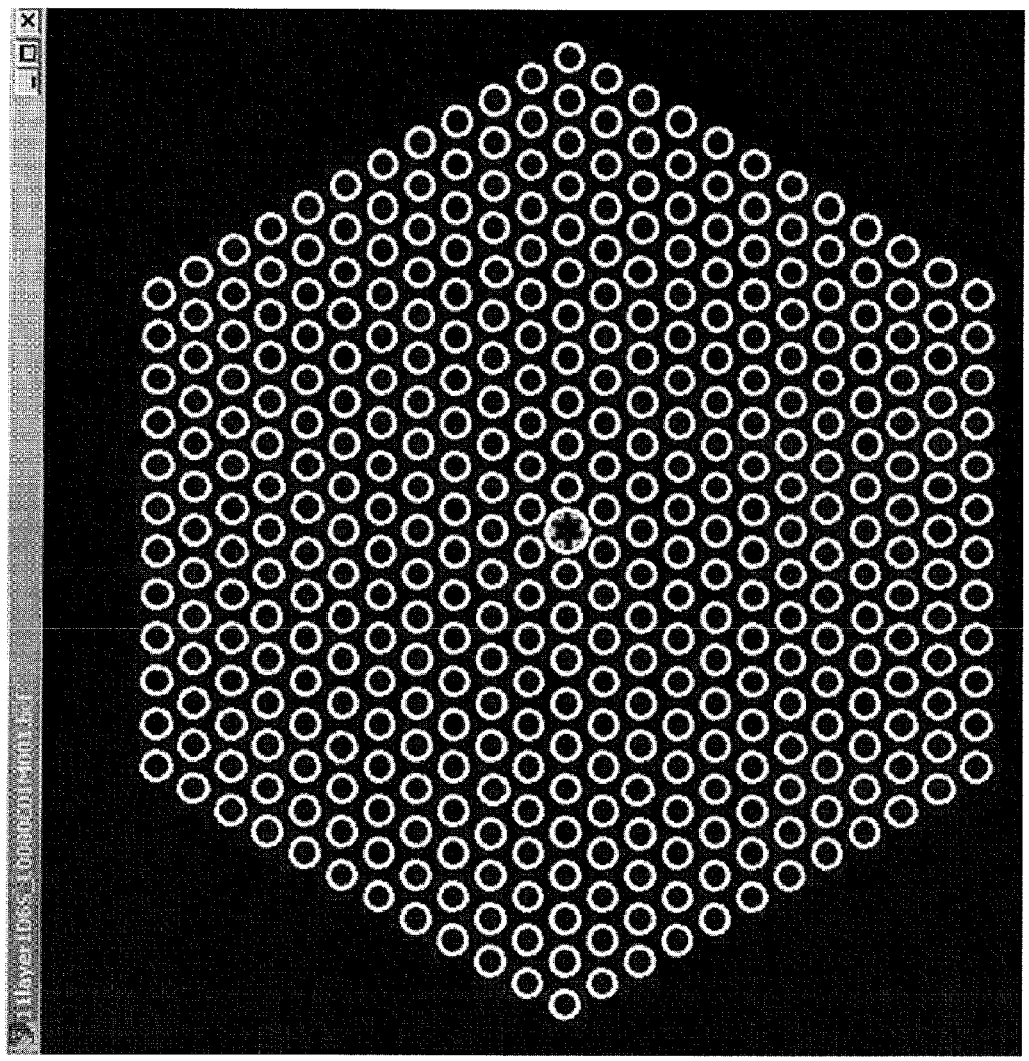
FIG. 14 shows the lattice with the central defect filled with glass, consistent with embodiments of the present disclosure.

FIG. 14 shows the lattice with the central defect filled with glass of the same kind, i.e., RI. FIG. 14 has the look of a whispering gallery mode with a nonzero field in the center, but very much lower than the peripheral fields as one goes outward toward the defect's wall. The RI for this mode is n=1.01817+7.218E-5(i) with a damage factor that is DF=1.0E-5 or essentially zero even though the meaning of this term is ambiguous here. This is due to the field's strong concentration in the glass-filled defect. The only other mode that was found was another surface mode that was zero in the center, but even higher in strength and much more uniform around the periphery while still being confined almost solely inside the defect and therefore with an even smaller DF.

In the following calculations, 5 rings separated the defects rather than 4, to simplify tracking changes and to reduce coupling effects even though it extends the calculations somewhat. Six or more rings could also have been used.

A good DF factor can be used as an important figure-of-merit for any future applications of this type of surface-mode PBG crystal, and is important for the TM01-like accelerating mode of interest for high energy physics. Generally speaking, the higher the DF, the higher the achievable gradient and therefore the higher beam energy per unit length or cost. This might allow the possibility of building a new linear collider, which may be an important step of "proving" the existence of super-symmetry.

To obtain high DF values, the structures can be created using dry, fused silica or quartz because this material can tolerate lower DF values resulting from the "as-built" structures as opposed to the "as-designed." Also, under ideal conditions, one might expect nearly an order of magnitude improvement from using good glass over Si, even with the latter's many fabrication advantages, because the bandgap differential for pure silica is approaching and, in some cases, exceeding the ionization potential for a number of solids and gases.

Figure 15:
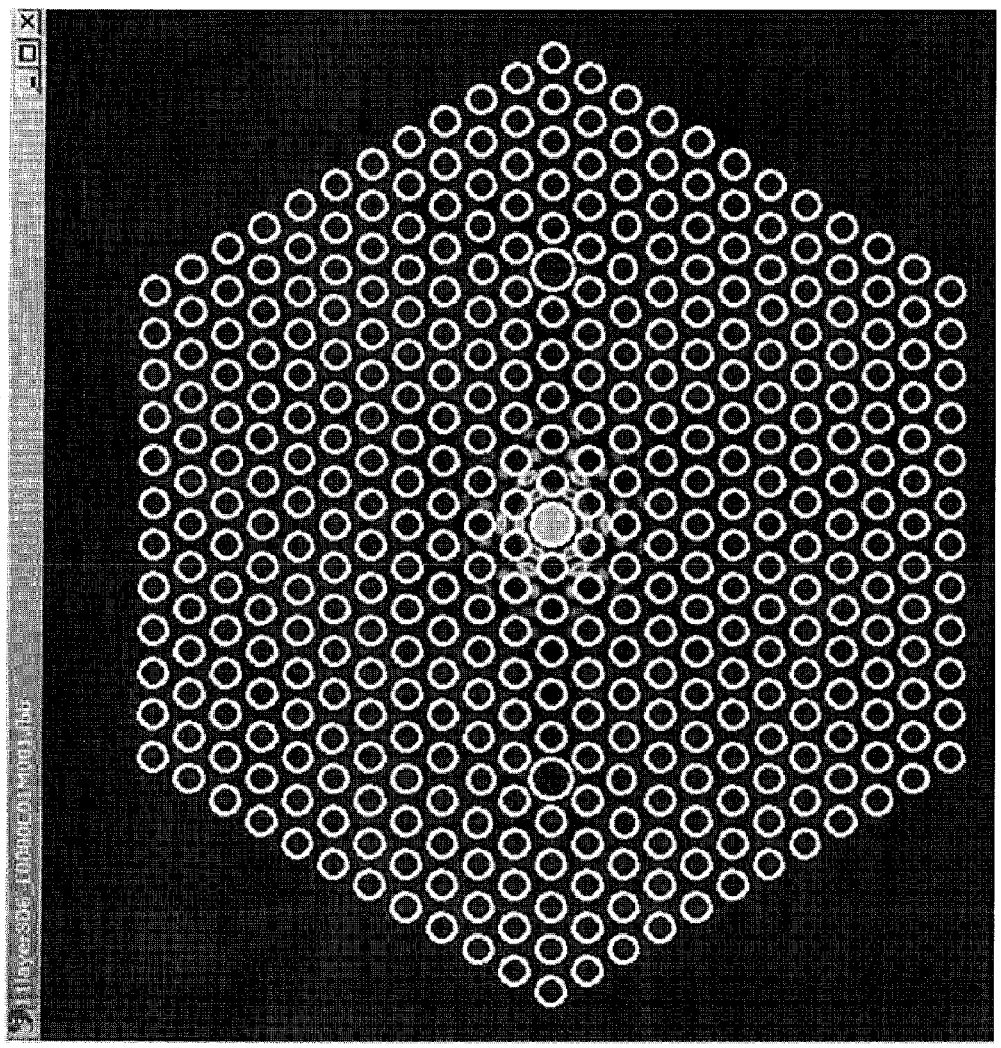
FIG. 15 shows 5 rings of capillary separating the central defect from two peripheral defects, consistent with embodiments of the present disclosure.

FIG. 15 shows 5 rings of capillary separating the central defect from two peripheral defects. Even with this separation there is still noticeable coupling between defects that reduces the strength of the central accelerating mode by more than 6%. Further, the peripheral modes are not good accelerating modes because they are distorted by their nearness to the outer boundaries and have strengths some 10% of the central defect even though this is not obvious from the figure. However, these defects have strong radial fields approaching 40% of the central defect's accelerating mode. Further, the radial fields are the dominant contribution to determining DF=0.48 or a 2.2% drop. The similarity of this distribution to the previous distribution is believed to be due to lattice's index of n=1.00310+3.7496E-5(i), i.e., an imaginary component that is nearly eight times larger due to the coupling(small) and the proximity of these defects to the edge. However, this lattice does not break the hexagonal symmetry so that the overall mode structure around the central defect remains nearly identical to the previous structure.

Various embodiments are directed toward increasing the number of rings as well as the separation between defects. Increasing the number of rings can make later symmetry calculations easier, with some 6 rings or more between defects showing the perturbative effect of adding rings.

Figure 16:
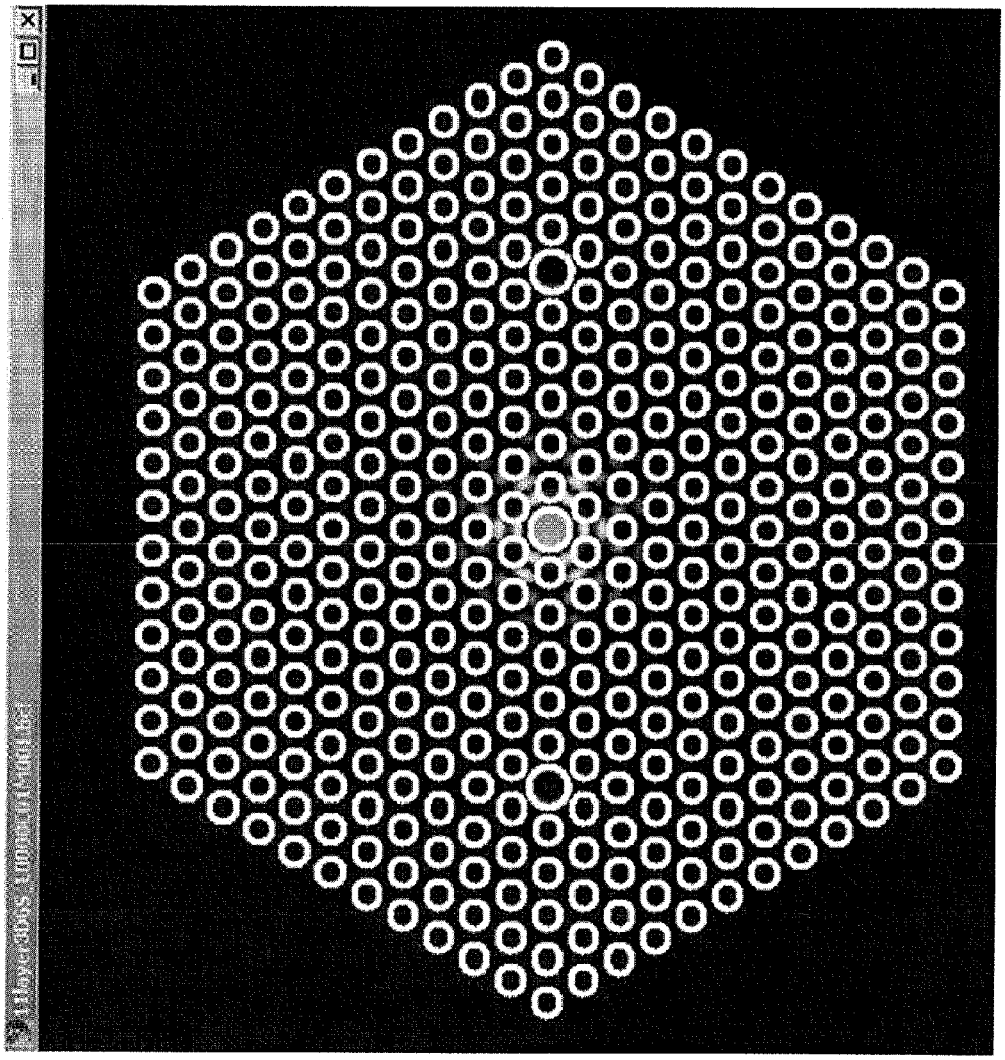
FIG. 16 shows a lattice with glass in the peripheral defects, consistent with embodiments of the present disclosure.

FIG. 16 shows a lattice with glass in the peripheral defects. This case shows the effects of loading the two outer defects with glass. Although their fields increase dramatically, it is small in their peripheral regions directly outside the defects in strong contrast to previous cases. While it is a hard calculation to make accurately, the DF goes to <0.1% over the very short distance of 100 μm due to the lack of total confinement of the mode in the glass defect and the mode itself. This is a potentially important effect to enhance the DF because of how well the central defect's mode can be maintained while improving DF using such schemes. The RI is quite good compared to the previous figure with n=1.00362+7.1174E-6. Further, the central field strength is reduced by only 0.22% from the base case so one can conclude that the effect of adding the glass is to shield and confine the diffractive losses without doing damage to the central accelerating mode. Notice that the central mode structure remains comparable to the previous cases. Also, in talking about DF values, it is assumed that the load material has a higher breakdown field than the glass.

While this barbell line defect perturbs the symmetry, it is only a minor perturbation. Further, it is necessary to note that this effect compliments our technique of adding capillaries at the hot spots to improve the DF. Likewise, it is important to keep in mind that the effectiveness of this technique is strongly tied to the number of rings separating the effective defects in the lattice.

Figure 17:
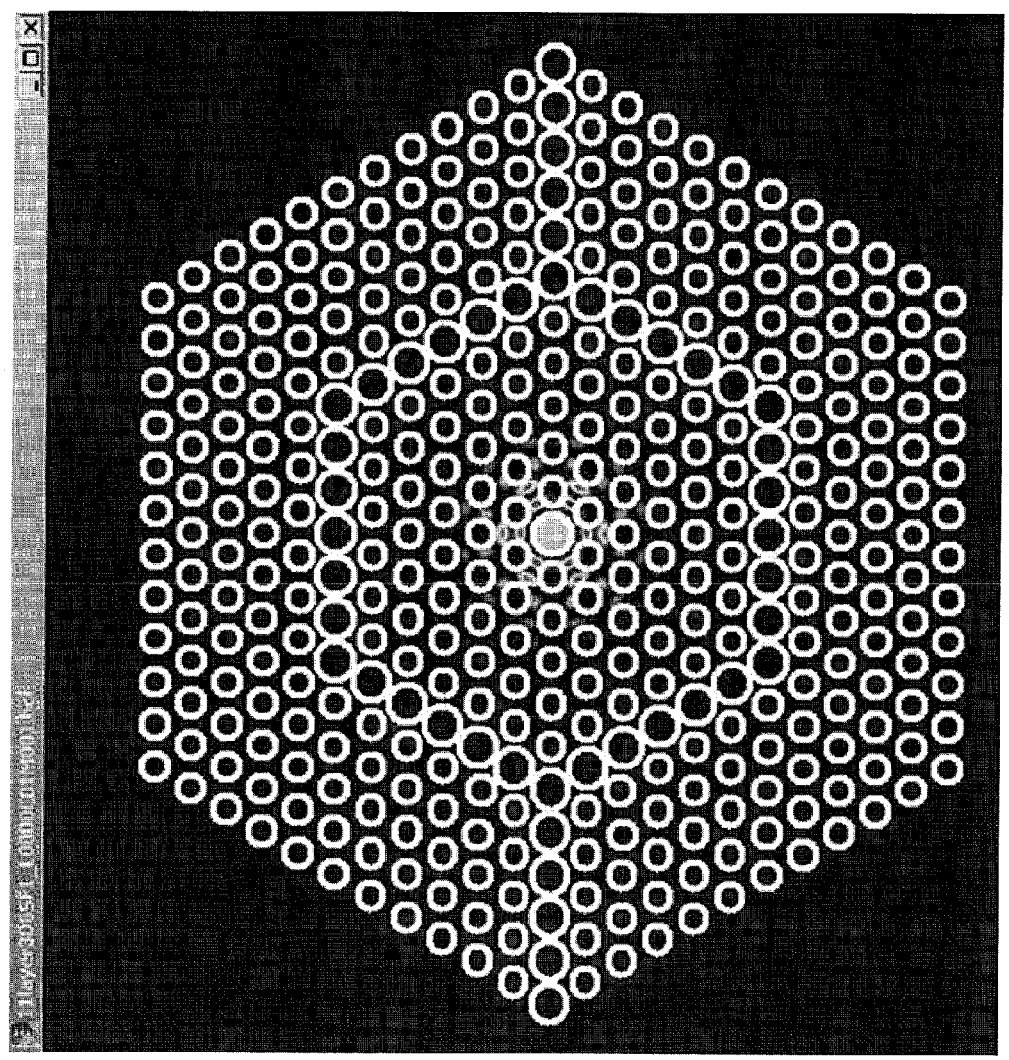
FIG. 17 shows a lattice which has increased a number of capillary radii in comparison to the first, single defect array and with glass in these defects, consistent with embodiments of the present disclosure.

FIG. 17 shows a radically modified lattice where the radii of a number of lattice capillary have been increased and each of these has been loaded or filled with glass while leaving the original central defect empty. A good accelerating mode remains, whose strength is within 1% of the basic single defect case and an improved DF=0.516 for a 5% improvement. The mode distribution is very similar to the above and the RI for this case is n=1.004190+3.35624E-5.

While it is apparent that the underlying hexagonal symmetry of the crystal has been broken, it has not had a significant effect on the mode because the basic crystal symmetry has not been broken inside the surrounding hex ring of glass that shields the central defect from the outer horizontal line defects. The next figure opens this protective hexagonal glass fence and thereby allows strong coupling to the line defects which effectively ruins the good central accelerating mode.

Figure 18:
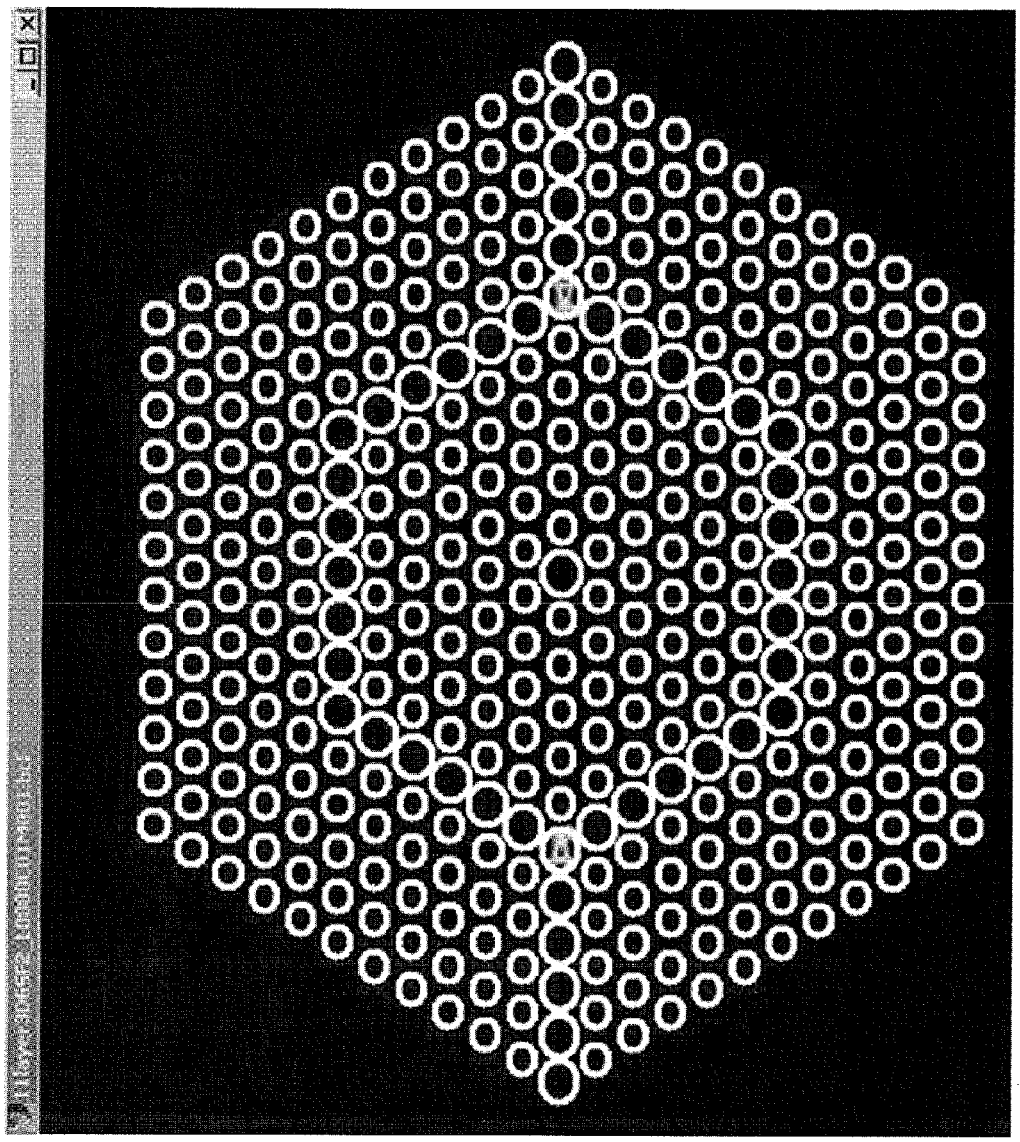
FIG. 18 shows the lattice of FIG. 17, but with the solid glass capillaries between the vertices of the enclosing solid hex ring now open, consistent with embodiments of the present disclosure.

In FIG. 18, the solid glass capillaries in the hex ring between its glass vertices have been replaced with the normal, but larger, open capillaries. It has many modes reflecting the underlying symmetries of the crystal. The two horizontal rows of large capillary outside the hex ring are still loaded with glass. While not apparent, there is still a reasonably uniform accelerating mode in the central defect but only 55% of the one seen in the basic lattice because of the stronger coupling to the horizontal glass defect vertices. Thus, there is not a pure dipole mode here, contrary to appearances. The RI is n=1.000766+5.3269E-5 and the DF is essentially zero.

It should be noted that this is the only example where there was more than one or at most two modes found whereas this lattice had more than twelve based on the two linear strings and the hex "ring" of 6 solid glass capillaries at the vertices.

Figure 19:
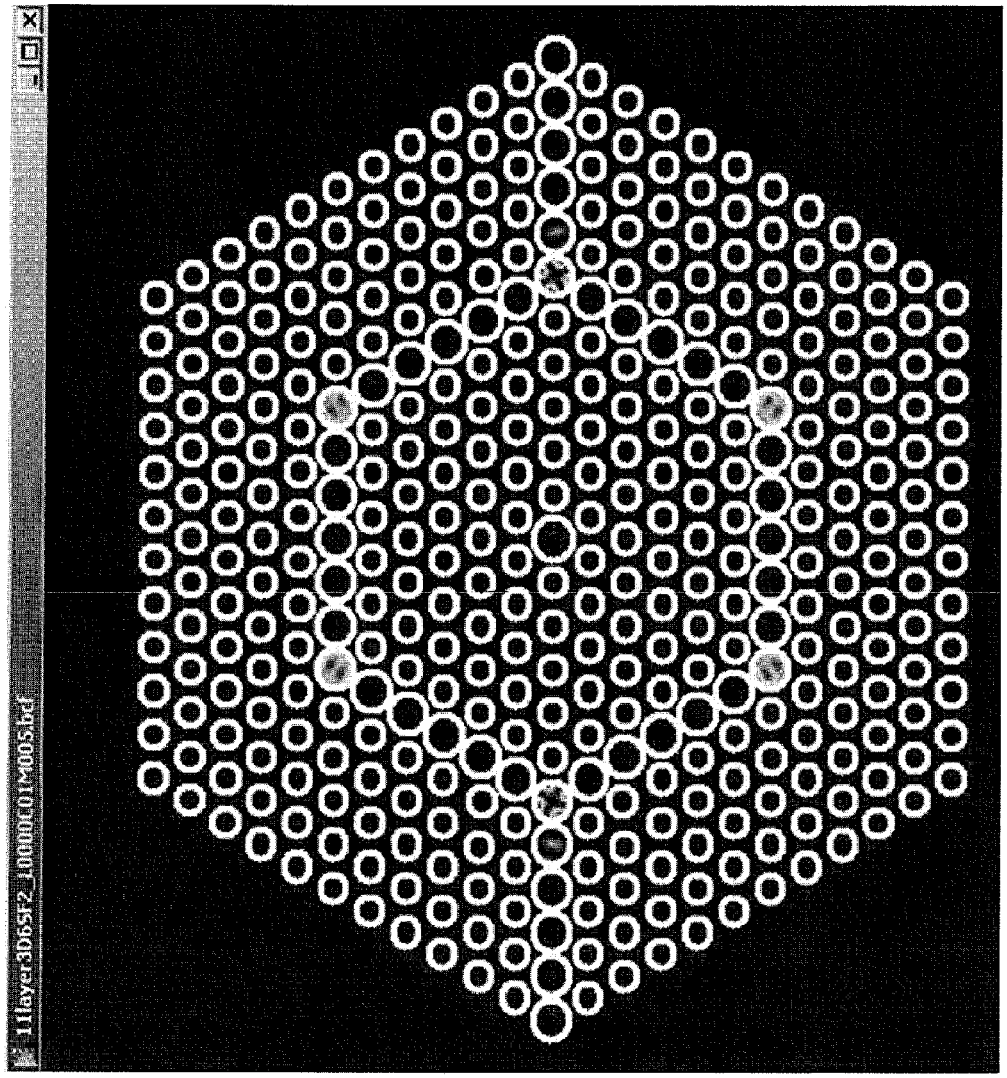
FIG. 19 has the same lattice as used for FIG. 18 but the mode that is shown has a significantly different RI, consistent with embodiments of the present disclosure.

FIG. 19 has a different RI from the previous mode, i.e., n=1.006203+4.0441E-4. The fields in the outer glass vertex capillaries are two orders higher than in the central defect. This and the fact that the glass line defects provide a path to the outside helps to explain the higher imaginary index. This mode is shown to illustrate that while this lattice shows a mixed or broken hexagonal symmetry, it may be said to have three distinct symmetries even though it is difficult to find modes fully reflective of these symmetries, e.g., the strong central accelerating field, the dipole or the hex ring.

Further, this is especially hard to observe when these different symmetries share common capillaries. In this case, there is mixing between the dipole and hex ring modes. A completely different example is shown next for contrast.

Figure 20:
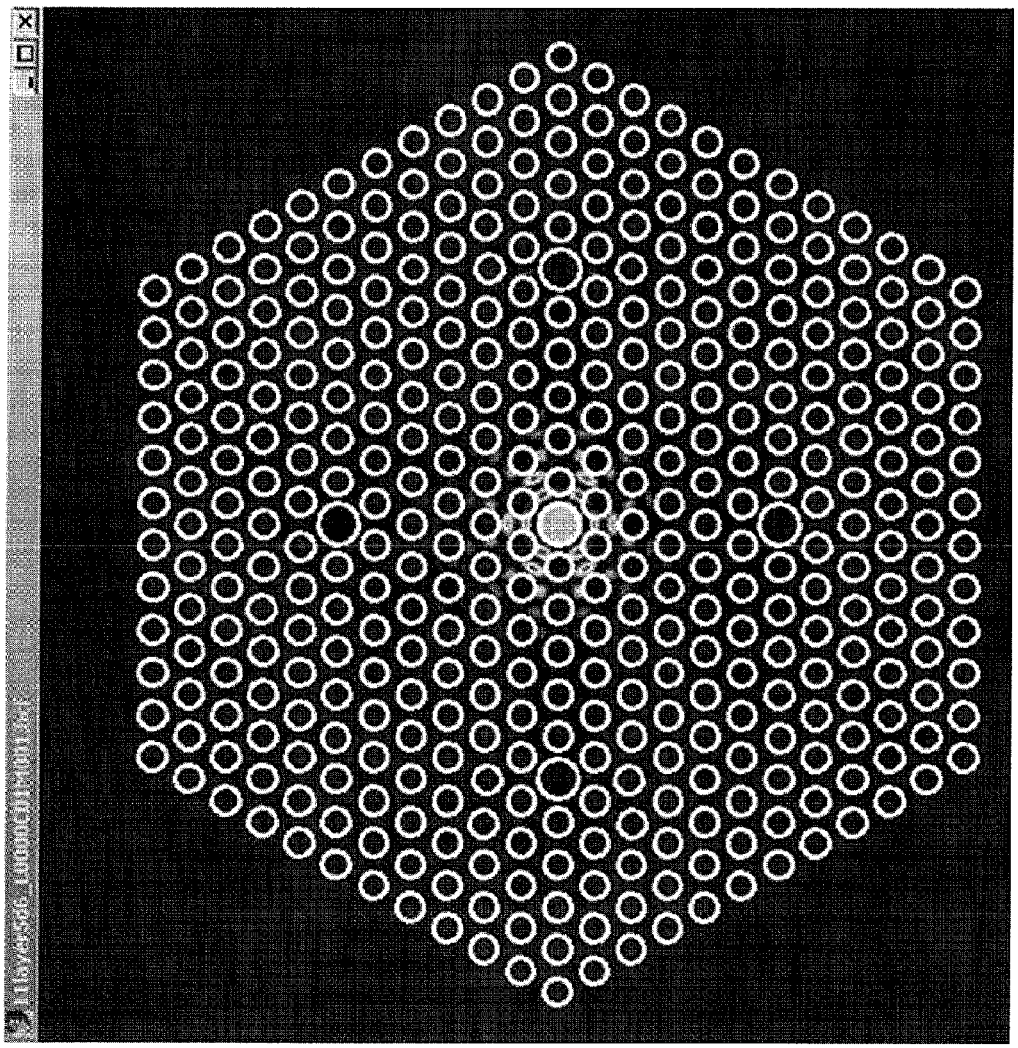
FIG. 20 shows a significantly different configuration of defects but still has the same fundamental mode structure with an RI n=1.002993+3.95262E-5(i), consistent with embodiments of the present disclosure.

FIG. 20 has the same fundamental mode structure with an RI n=1.002993+3.95262E-5(i). The field strength decreases by 8%, but the DF increases by 6% to DF=0.52 giving only a small net loss which is somewhat surprising. This is due in part to replacing the large dipole capillaries with the conventional lattice capillaries. The next figure compares these numbers to one with a larger ring count.

Figure 21:
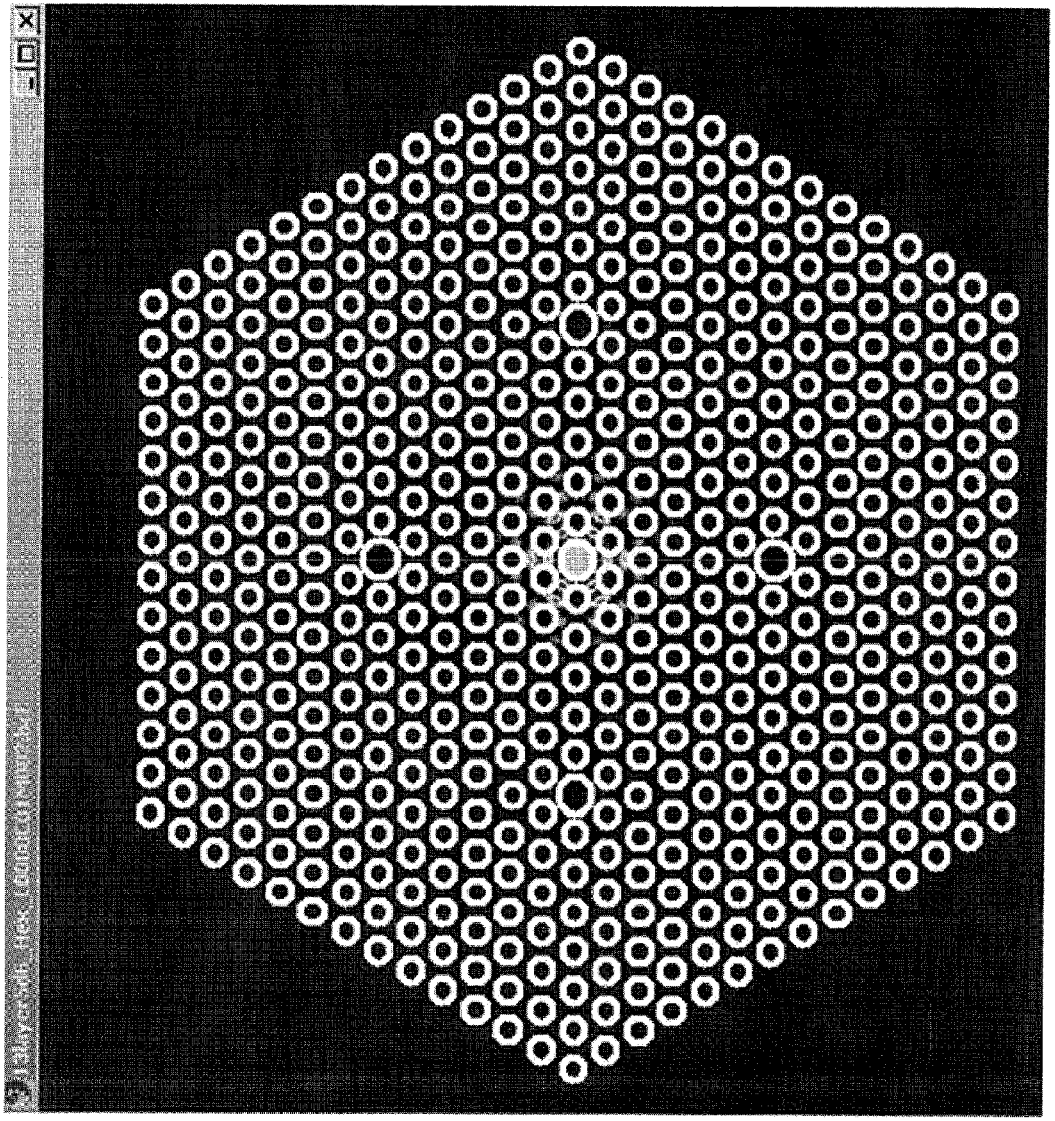
FIG. 21 shows an example where the surrounding ring count is increased to 13, consistent with embodiments of the present disclosure.

FIG. 21 shows an example where the surrounding ring count is increased to 13 giving an RI of n=1.002993+8.2871E-6 with a field strength that is slightly better than the previous 11 ring case, but still decreases by 8% from the original 11 ring, single defect base case while DF increases to DF=0.53 or an increase of 7.3%. As such, there is still an overall net loss but it is small, and the mode structure remains the same.

The next figures help to explain the advantages of a somewhat larger separation between defects and also show that the optimal separation is >6 rings or so rather than five. They help demonstrate the viability of the matrix accelerator in a comparatively simple, single hex lattice.

Figure 22:
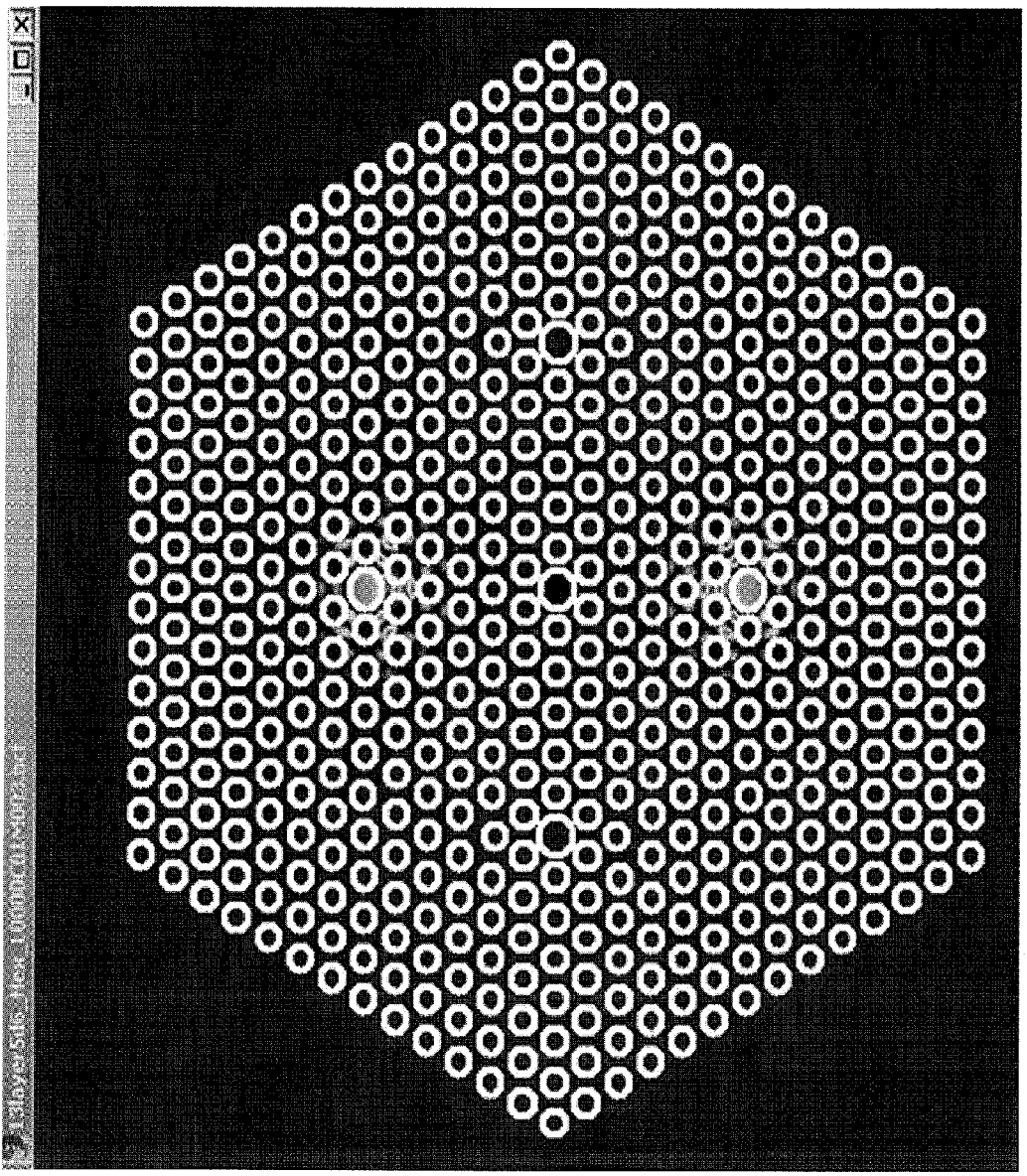
FIG. 22 shows another eigenmode where the imaginary index increases considerably because of the proximity of the mode's strength to the outer boundary, consistent with embodiments of the present disclosure.

In the lattice of FIG. 22, which is the same as the previous one, another eigenmode is shown where the imaginary index increases considerably because of proximity of the mode's strength to the outer boundary. Note that the structure of the accelerating mode in the outer defects is very similar except for leakage on the sides nearest to the closest boundary where diffractive losses are largest. RI is n=1.004782+2.4456E-5. Another orthogonal eigenmode is shown next that is useful to allow one to excite all of the possible accelerating channels as a linear combination of these eigenmodes in this lattice. It is to be noted that this is not a unique combination for this task but simply demonstrates the theoretical basis for the matrix linac. It is believed that this demonstrates a better use of the term "linear" accelerator than previous usage.

Figure 23:
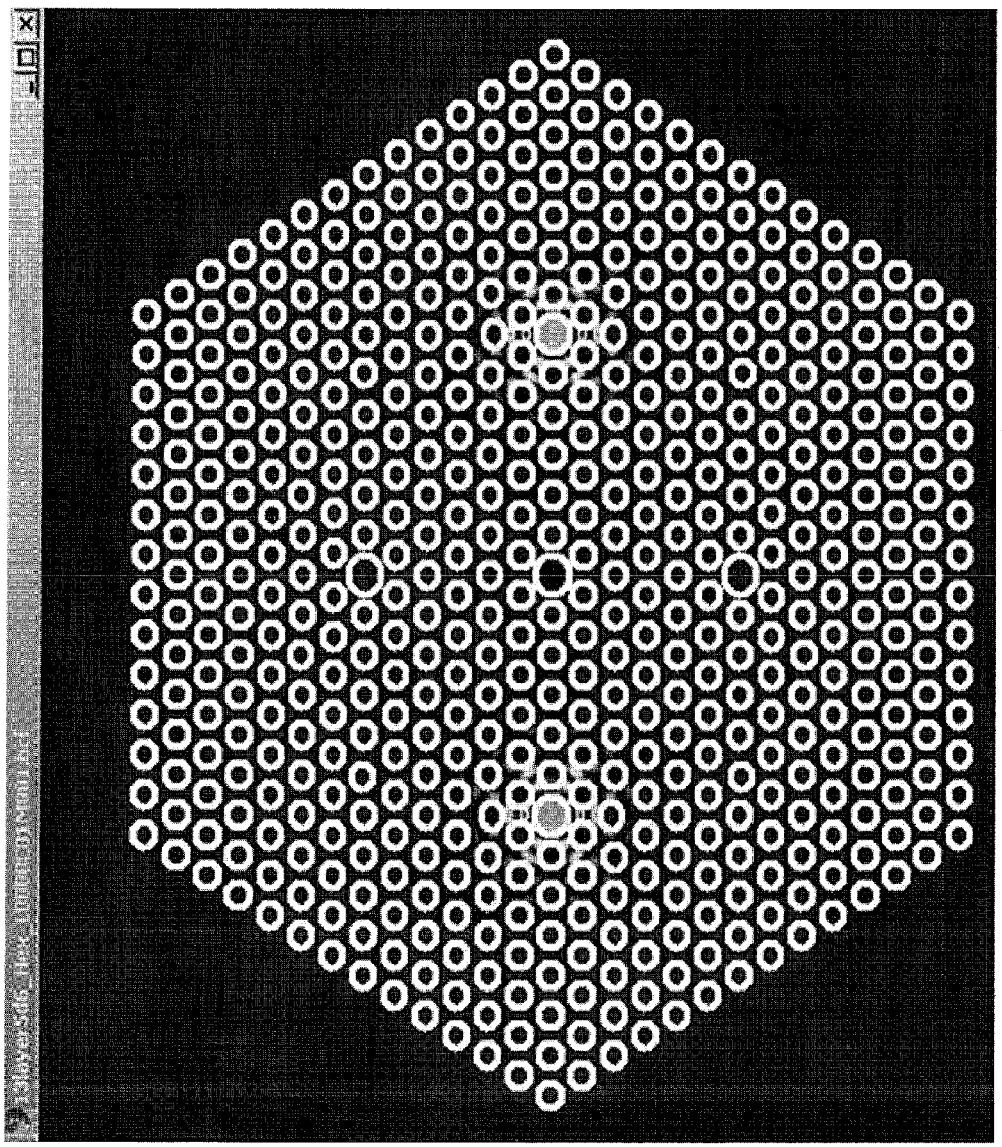
FIG. 23 shows an eigenmode, with the same local mode structure in the excited defects but perturbed by the nearness of the other defects and the closest boundaries, consistent with embodiments of the present disclosure.

FIG. 23 shows an eigenmode, with the same mode structure in the excited defects, but perturbed by the nearness of the other defects and the closest boundaries. The RI here is n=1.000709+5.13077E-5. The difference with the previous mode is a result of the different symmetry of this mode relative to the underlying crystal symmetry. It is possible to excite this mode alone by using two synchronized laser pulses coming in on either side of the two horizontal vertex capillaries nearest the excited defects. The DF here is only weaker than the original single defect case by 1%.

There are various manners in which modes can be excited, and there can be several ways to excite modes simultaneously. For instance, one could use two laser pulses, e.g., coming in along the horizontal axis and phased differently depending on what defects one wants to excite. To excite the central mode alone one could couple them in through the outer defects and adjust their phases to interfere in the center. This is also excitable by end coupling as are the others. By eliminating one of the outer defects, one can excite the central defect with a single laser pulse. However, this pulse has a different structure from the previous double pulse example which is not unique either in that one need not couple through the adjacent defect. Similarly, the outer defects can be excited either singly or together, although the distribution of the input laser pulses will differ.

Figure 24:
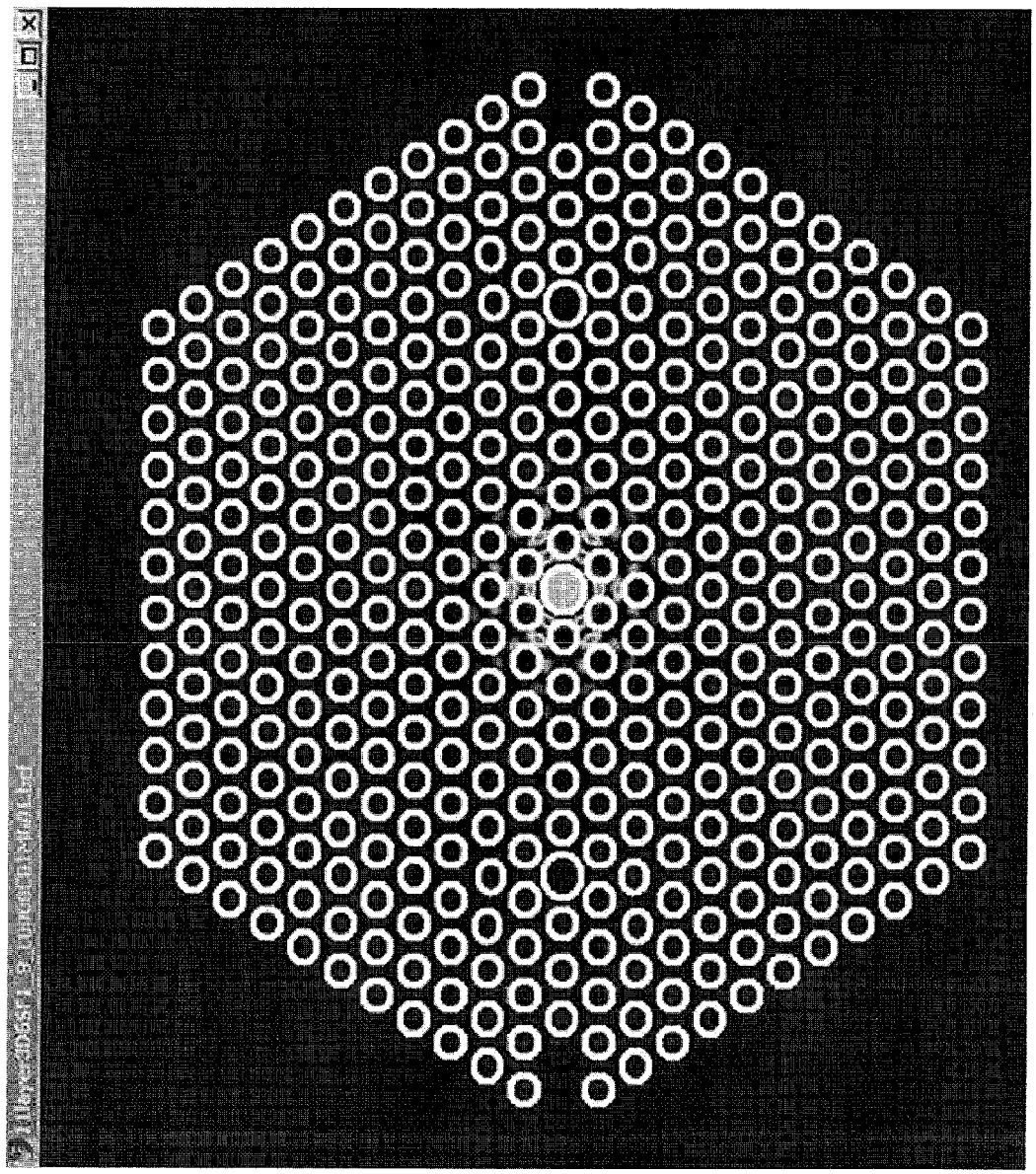
FIG. 24 shows an example of a ⅗ defect accelerator matrix in a single PBG crystal lattice having 11 rings of capillary, consistent with embodiments of the present disclosure.

FIG. 24 shows another example of a 3 defect accelerator matrix in a single PBG crystal lattice having 11 rings of capillary. In this example, one could excite either the left or right defects alone by using only two laser pulses or one as for the central defect and therefore by extension, one can excite any single defect or any combination here.

This case can be thought of as an effective "5-defect" matrix in a single PBG lattice where the missing capillaries near the end of the horizontal vertices represent an asymmetric extension of the line defect in that these effective vertex defects are separated by only 3 capillaries from their nearest neighboring defects rather than 5. Also, the surrounding ring of solid glass capillaries has been moved outwards from the peripheral defects by 2 layers but without intercepting the horizontal, linear defect chains.

Figure 25:
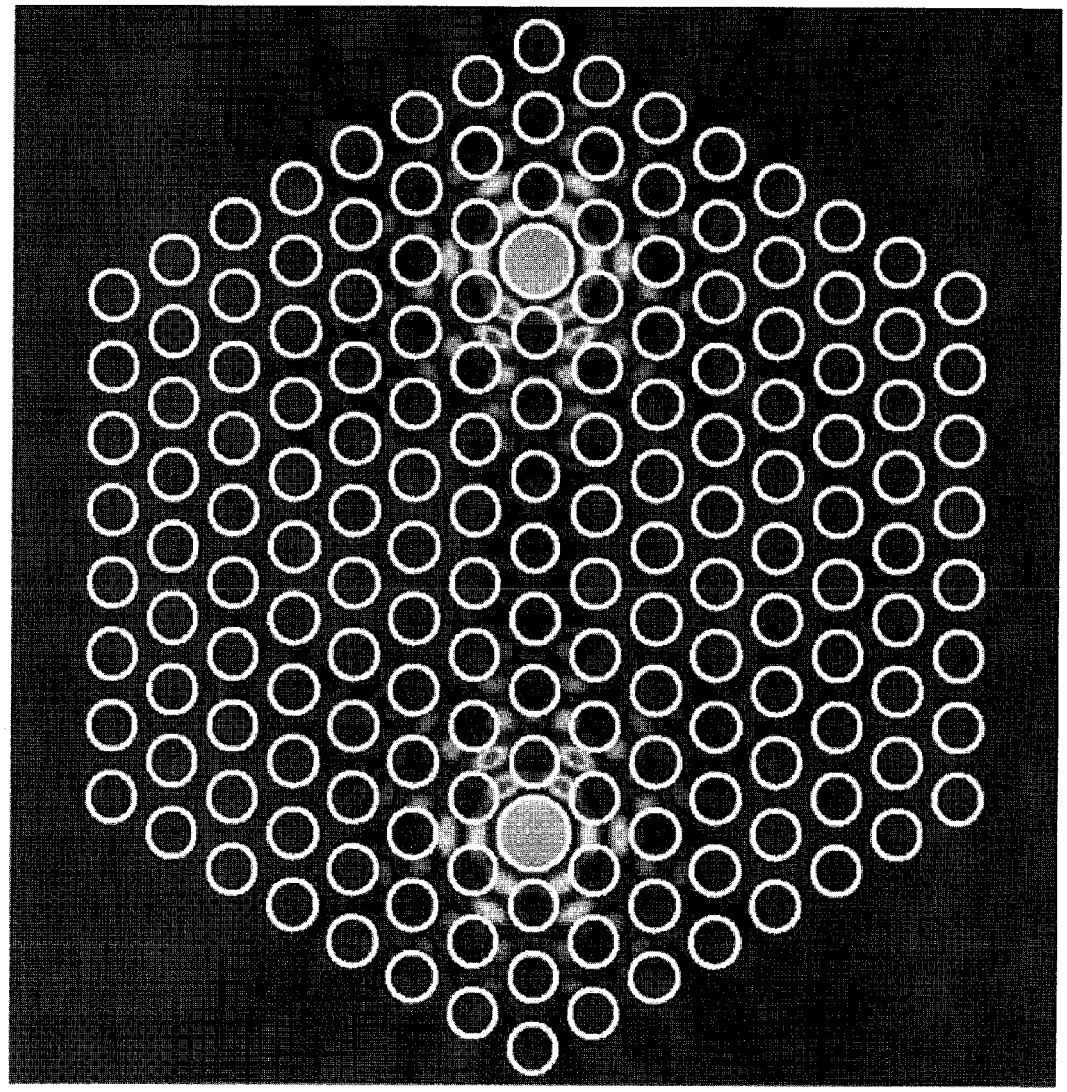
FIG. 25 shows how the modes are tied to the underlying lattice structure as a whole and may be said to be "just waiting" for defects to appear, consistent with embodiments of the present disclosure.

FIG. 25 shows how the modes are tied to the underlying lattice structure as a whole that may be said to be "just waiting" for defects to appear. This shows a different structure with no central defect but accelerating modes with the same general structure as before except for the perturbing effects from the diffractive losses at the nearby boundaries.

Tests using a 60 MEV electron linac, the NLCTA at SLAC, have been applied to a variety of structures that have been fabricated based on simulations, but the measurement results suggest mismatches in scale between an RF structure and the "THz" regimes of the accelerator and the PBG structures of interest. Thus it can be difficult to overcome a fundamental scale limitation that is "built-in" and seems to manifest itself in many aspects of such tests according to the various tolerances that go as some power of the frequency scaling of more than three orders of magnitude between the RF and THz. A broader definition of "defect" is given as well as a demonstration of the close relationship between the modes of a crystal to its underlying crystal symmetry.

Figure 26:
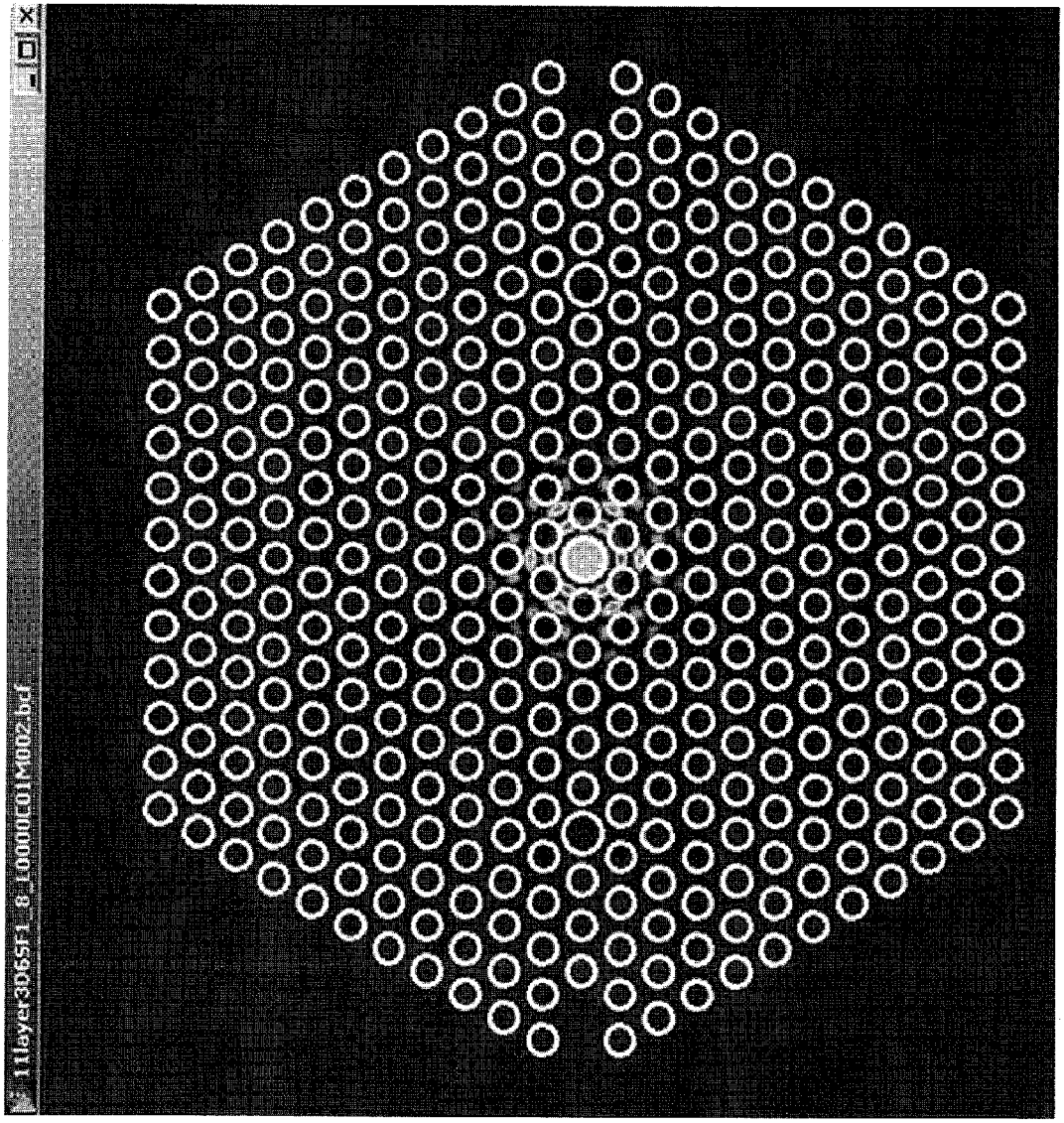
FIG. 26 shows interplay between the underlying lattice symmetry (hexagonal) and the defect symmetries (line (open) and ring (solid)), consistent with embodiments of the present disclosure.

Related to this, FIG. 26 shows an example relevant to the interplay between the underlying lattice symmetry (hexagonal) and the defect symmetries (line (open) and ring (solid)) where the surrounding ring is displaced outwards by one ring so that it does not overlap the line defects anywhere, i.e., share any common capillary locations. FIG. 26 shows the accelerating mode. This case corresponds to a good accelerating mode within 4-5% of the original single defect strength and a DF that is 2% better with DF=0.500. The next two modes are examples of ring and line defect modes.

Figure 27:
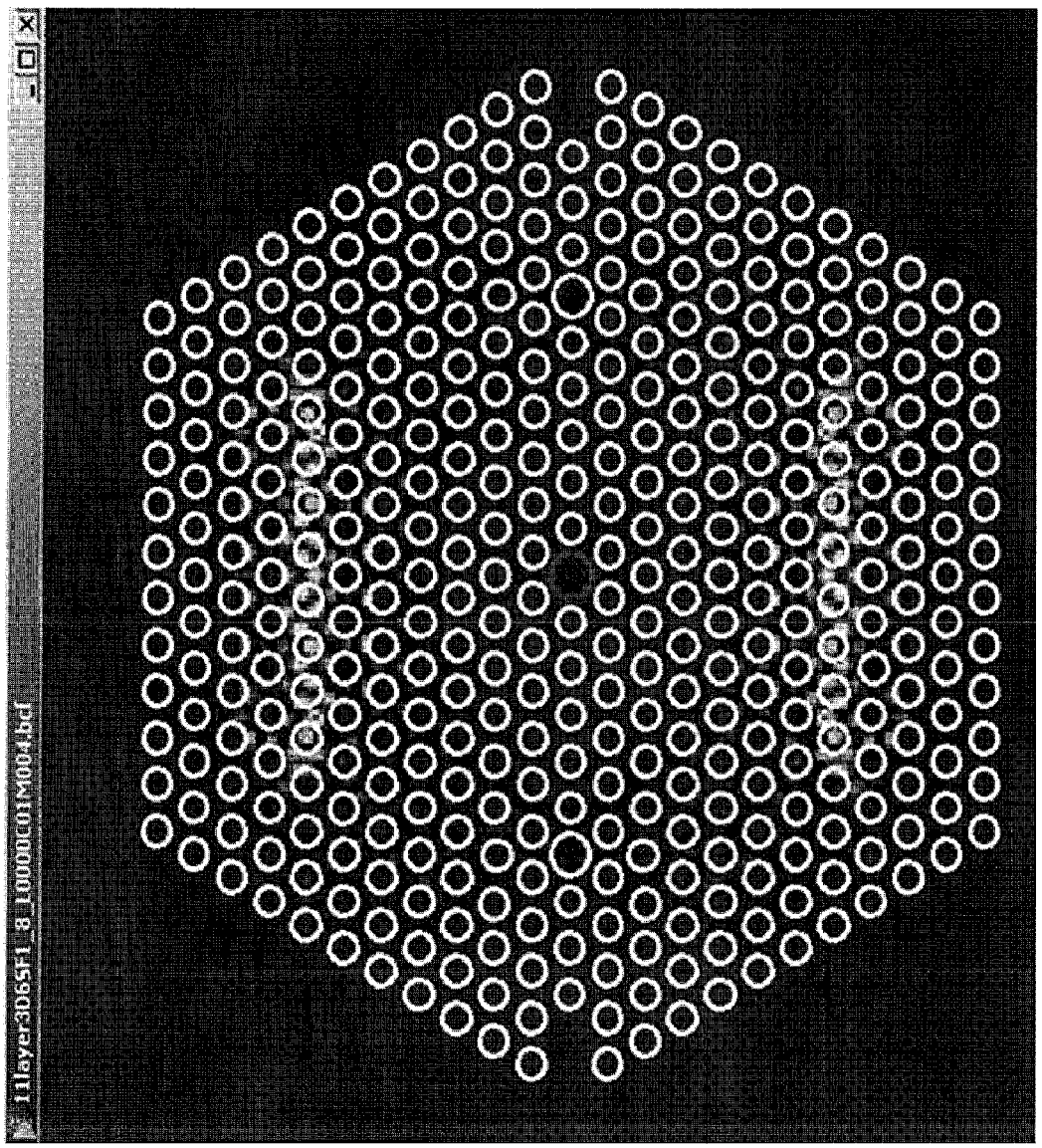
FIG. 27 shows a defect mode excited in the upper and lower lines of glass capillaries in the ring of glass capillary surrounding the central defect, consistent with embodiments of the present disclosure.

FIG. 27 shows a defect mode excited in the upper and lower lines of glass capillaries in the ring of glass capillary surrounding the central defect.

Figure 28:
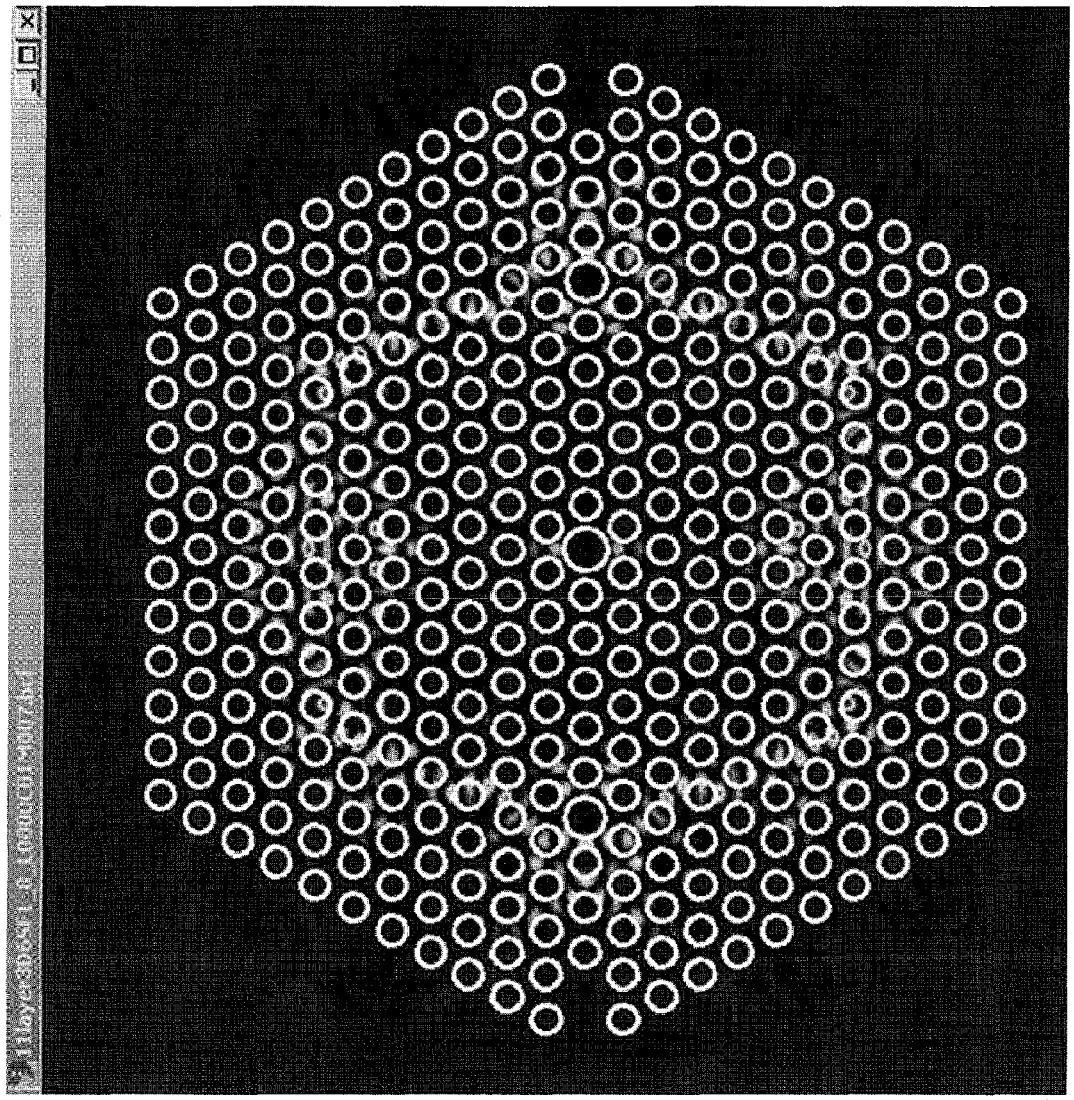
FIG. 28 shows a mode that is associated with the ring defect structure, consistent with embodiments of the present disclosure.

FIG. 28 shows a mode that is associated with the ring defect structure. There are several variants of this ring mode related to various closures or lack thereof of these modes around the glass ring. This ring mode clearly traces out the glass loaded capillaries that define this defect structure, but is complicated by the nearness of the external boundaries that vary as you go around the ring. This can be improved by adding rings on the outside and adding the missing capillaries back along the horizontal.

A number of examples have been given that demonstrate some new ways to modify and control the properties of PBG crystals. The emphasis has been on hexagonal lattices with TM01-like modes for acceleration since these and other related modes seem to have the most obvious applications ranging from basic science to Homeland Security. Further emphasis has been on the symmetry of the defect arrangement within the single hexagonal lattice where the proximity of the defects to one another plays an important role, especially in the matrix accelerator where typically one wants to have the same mode excited with the same strength and distribution in every defect. At the same time, one would like to be able to adjust both their strength and distribution because these characteristics are clearly affected by their different local relation to one another and to their nearest boundaries wherever they happen to be in the lattice, especially when they are near to the circumference of the crystal and the defect array symmetry differs from the basic crystal symmetry. At the same time, it is important to realize that these characteristics provide further potentially useful tools to change or modify a mode.

Other reasons to change or modify a distribution include the effects of space charge of one bunch on its nearest neighbors. Of course, none of this is important if efficiency is not at issue except under special conditions, e.g., when one wants to combine the matrix of bunches into a smaller number or set of reduced matrices to build up the bunch charge to achieve higher luminosity in a collider scenario or to shape a combined bunch either longitudinally or transversely without losing the improved phase space density that accrues from the matrix production and transport scheme that was our original justification for this approach.

A relevant characteristic for TM01-like modes is the field strength and corresponding DF. Improvements can be made by optimizing the lattice parameters as just discussed, e.g., increasing the number of capillary rings. However, one can also improve DF by adding unloaded, auxiliary capillary at strategic hotspots in the lattice or by adding loaded defects that act as what may be called "field attractors." The following discussion identifies a few non-limiting examples of techniques that can improve the central field strength and, at the same time, improve the DF and/or other characteristics.

The general importance of DF to surface modes was given but especially to the field of High Energy Physics (HEP). Note, the general relevance follows almost by definition from the form of surface modes. The importance of contaminants in the glass and how it affects things was discussed, e.g., in unfolding the strength of bandgaps from other resonance sources that can be nearly degenerate as demonstrated. Techniques to unfold overlapping resonances from different sources were discussed beyond various model or curve fitting techniques.

Such subjects suggest the development and use of much more complex materials, especially amorphous ones, where induced resonance lines can be introduced for various purposes including the study of short range order and/or long and intermediate range interactions. However, very pure or "good" glass has been shown to be particularly useful.

As opposed to including small glass capillaries or defects for various purposes such as mediating "hot spots" in lattices a discussion was given of the use of a their "duals" i.e., loaded, aperiodic capillaries that can act as field attractors depending on their sizes compared to that of the defects in the lattice.

A major discussion was provided regarding the role of symmetries in most of the above cases, e.g., coupling effects based on the separation of nearest neighbor defects and/or proximity of the defects to the bounding surface of a crystal and its underlying symmetry, or whether that surface was distorted in some way, e.g., to provide an effective defect. In this same area, a discussion was given on the importance of the relative size of any defects compared to the smaller lattice capillaries and whether such defects were loaded or not. The use of defects to couple laser pulses into a lattice to excite modes in various ways was discussed as were different coupling schemes, such as the relation of "conventional" end-coupling to the cleaved end face side-coupling that can be derived from it. Scale mismatch between the test accelerator and the new accelerator under test is also a relevant consideration.

Consistent with various experimental embodiments and tests, the following discussion describes additional and complementary embodiments of the present disclosure.

Figure 29A:
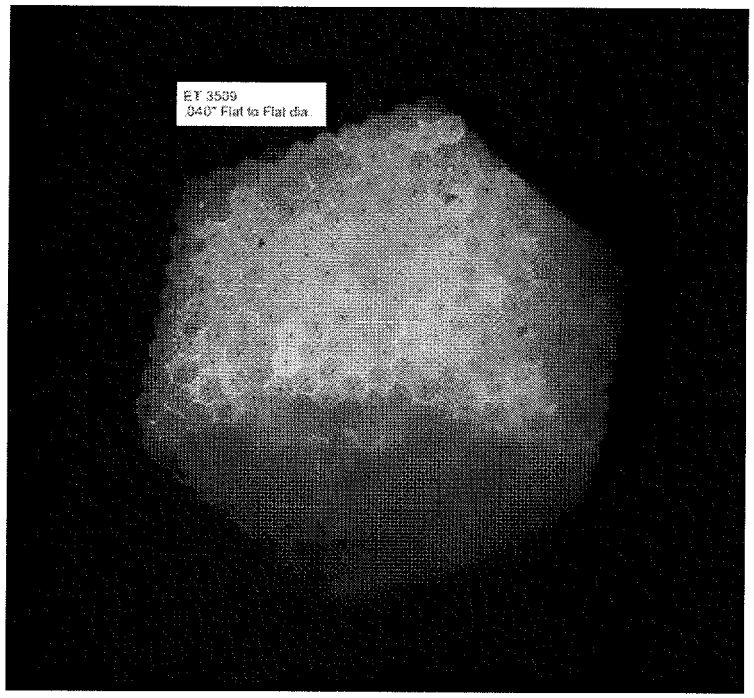
FIGS. 29A-29B show a wafer with an (approximately) 21×21 matrix of single defect lattices each having 11 rings of capillaries per defect, consistent with embodiments of the present disclosure.
Figure 29B:
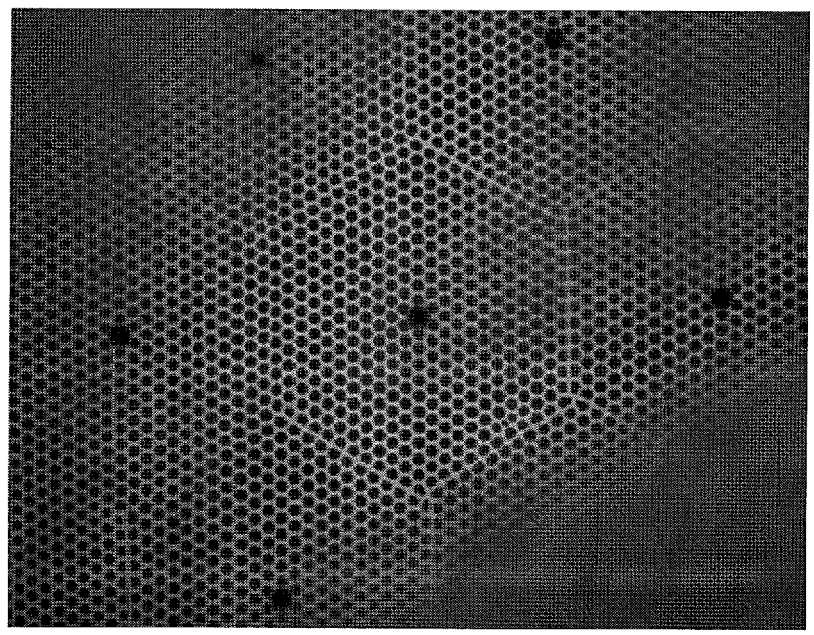

FIG. 29A shows the ET3509 wafer manufactured by Incom Inc. with the hexagonal structure that is ~1 mm OD composed of an array of smaller hexagonal cells. Each of these smaller hex arrays of capillaries has a single, central defect surrounded by 11 rings of capillaries, as shown in FIG. 29B (using greater magnification). The individual defects here have diameters of 4 microns and the surrounding capillaries have diameters of 2 microns.

FIG. 29A shows a wafer with an (approximately) 21×21 matrix of single defect lattices each having 11 rings of capillaries per defect. Each defect, shown in more detail in FIG. 29B, has accelerating modes with $\lambda=2.1$ µm (shown in FIG. 30A) and $\lambda=1.6$ µm (shown in FIG. 30B) associated with different bandgaps. Scaling this structure down to allow one to use Nd:YAG at 1 µm for the 2.1 µm mode suggests the use of a Ti:Sapphire laser at 0.76 µm for the scaled 1.6 µm mode.

Translating such a possibility as demonstrated here for a single defect, multiple bandgap fiber to the telecom field would allow a greatly increased bandwidth for very little increase in costs compared to such current techniques as wavelength division multiplexing that requires very low dispersion. The dispersion here is easily tailored by the perturbation techniques to be discussed but is already near zero in both cases (see FIGS. 30A-B) because the modes are roughly centered in their respective bandgaps.

Figure 30A:
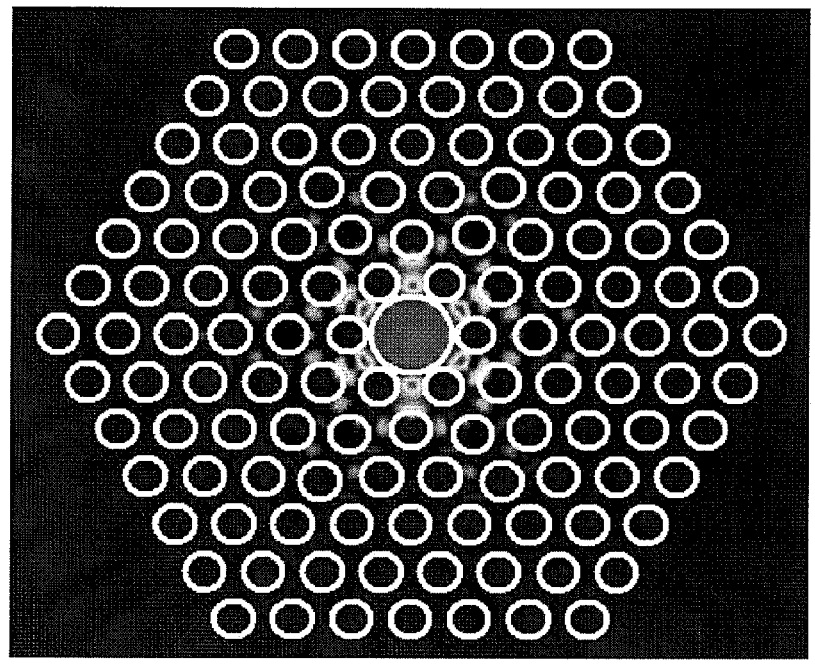
FIG. 30A shows an accelerating mode with wavelength $\lambda=2.1$ μm that has a damage factor DF=0.45 and an effective index n=(1.00664, 1.537E-3), consistent with embodiments of the present disclosure.

FIG. 30A shows an accelerating mode with wavelength $\lambda=2.1$ µm that has a damage factor DF=0.45 and an effective index n=(1.00664, 1.537E-3). This corresponds to the Incom, Inc. fiber ET3509. While it has a variety of perturbations to the ideal lattice, it still has the characteristic pattern for an accelerating mode and is testable now using a Tm:YAG laser at this wavelength. See FIG. 3 for the bandgap diagram where one sees that this mode falls in the lowest bandgap that crosses the light line.

Figure 30B:
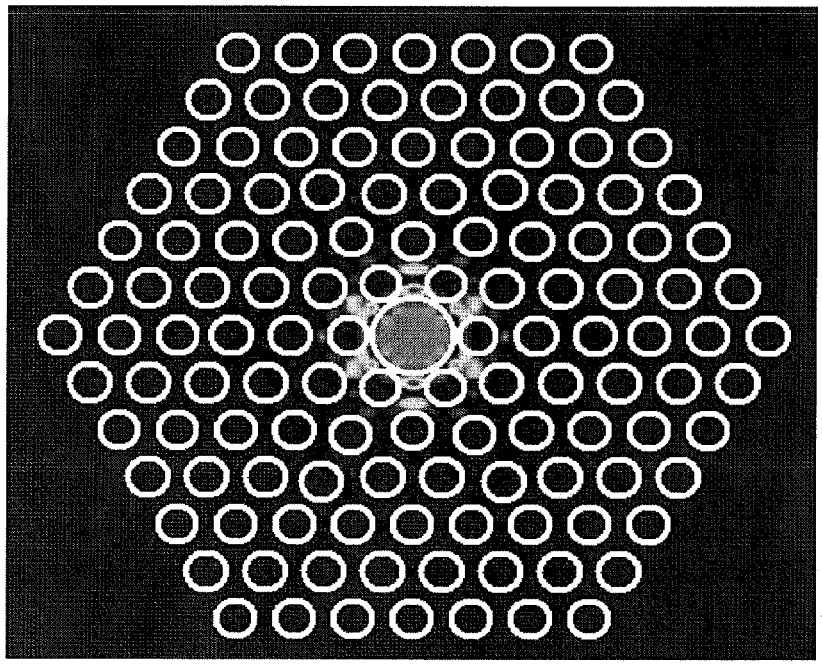
FIG. 30B shows an accelerating mode with wavelength $\lambda=1.6$ μm, consistent with embodiments of the present disclosure.

FIG. 30B shows an accelerating mode with wavelength $\lambda=1.6$ µm as discussed above on the basis of the as-built parameters for ET3509 shown in FIG. 29. This also has a damage factor DF=0.45 and an effective index n=(1.0002, 6.986E-5). As above, it has a variety of significant perturbations to the ideal lattice but it still has the characteristic pattern for an accelerating mode and is presumably testable now with an Er-doped laser.

FIGS. 29A-B and 30A-B show examples of how to increase the throughput or bandwidth using the single defect lattice mentioned above. FIG. 3 shows the bandgap diagram for the structure shown in FIGS. 29-30 that helps one understand how this comes about where the gaps are broad near their intersections with the speed of light (SOL) line and the modes are near the centers of their respective bandgaps.

To demonstrate some perturbations to the structure shown above and how they relate to coupling the base structure, the unperturbed case is shown in FIG. 4a having the primary characteristics just shown in FIGS. 29-30. A few differences here are the uniform size and placement of the lattice capillaries. Since the symmetry is not perturbed yet, a hexagonal radiation pattern is expected around the external boundary in FIG. 4b as demonstrated for end coupling. In FIG. 4a, the central field strength is reduced by less than 0.2% by removing the vertex capillaries as shown in FIG. 4c while $n_{imag}$ is increased by 62% to n=(1.001437,3.42173E-4) while $n_{real}$ changes by less than 0.003%. The resulting pattern is more directed and stronger in FIG. 4c and could be enhanced further by additional changes near the vertices such as eliminating another capillary along the symmetry lines and perturbing the adjacent capillaries on either side of this line. Not shown is the Poynting vector in FIG. 4, but only one component of it for an improved view.

FIGS. 4-5 show photonic bandgap micro-capillary arrays with a) the uniform field accelerating mode $|E_z|$ in the defect, and b) a diffuse, hexagonal pattern of radiative loss around the vertices and in c) a more directed pattern obtained by eliminating a single capillary at each vertex.

FIG. 5 shows the effects of reducing the number of capillary rings to enhance the side coupling efficiency. A hexagonal radiation pattern is expected, although it may be more diffuse. The central field strength is reduced by less than 2.5% by removing the vertex capillaries while $n_{imag}$ is increased by 158% to n=(1.0022956,3.22418E-3) but $n_{real}$ changes by less than 0.07%. The radiation strength is clearly increased compared to that in FIG. 4.

For both end and side coupling the symmetry of the radiation pattern (and by inference, the coupling symmetry) is that of the underlying photonic crystal which presents some challenges. First, it is very different from that encountered in the telecom field and it is definitely not easier. Further, the surface character of these modes, as opposed to the core modes of telecom, implies the designs are essentially dual to one another. This has many implications. Still, there are advantages, e.g., the possibility of integrating the laser drive system into this hollow core fiber in a natural way. The hollow core allows for passage of the electron beam without undue degradation of its properties such as its emittance or energy spread.

Figure 31:
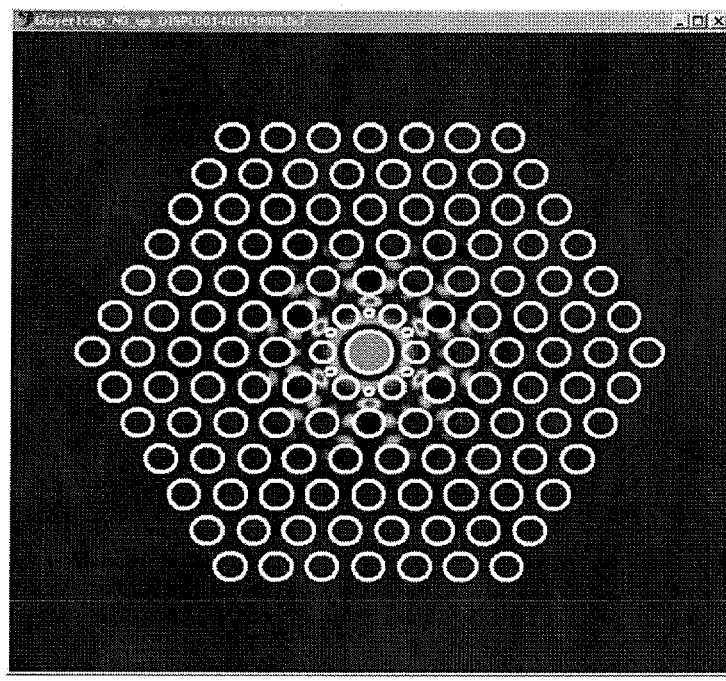
FIG. 31 shows a PBG crystal with six extra, very small, unloaded capillaries added as well as with a reduced radius for the first, innermost ring, consistent with embodiments of the present disclosure.

For the laser, existing capillary and/or newly included ones (as above) near the defect could be filled with doped laser material such as suggested in the captions for FIGS. 30A-B. When the material is not doped, e.g., pure YAG crystal, the effect may provide both a phase delay and/or an increase in the achievable gradient as shown in FIG. 31 where a ring of six small, open capillaries were added and a ring of six hotspots were eliminated from FIG. 4 and FIG. 30A providing the possibility of increasing the drive laser field before breakdown occurs in the material. Being close to the defect, these "inclusions" perturb the field distribution so it may be necessary to make further adjustments.

FIG. 31 shows a PBG crystal with six extra, very small, unloaded capillaries added as well as with a reduced radius for the first, innermost ring. While not necessarily optimized, the extra capillaries eliminate six hot spots. No attempts were made to optimize the central field strength or damage factor.

When these or other capillaries are loaded other possibilities arise including rejuvenation of the laser pulse or the possibility of phase shifting the laser pulse (relative to the electron pulse). It should be noted that when the included material has a higher breakdown field than the lattice material these other possibilities can be pursued simultaneously with the improvement of the gradient. As noted above, multiple bandgaps exist that can be driven at different laser frequencies. How one excites the modes in these different bandgaps becomes much more interesting and should provide further applications including coupled systems such as OPOs, OPAs and various pump-probe experiments. A particularly interesting possibility is one that does not actually insert a laser gain medium although the relevant capillaries might be coated with some gain material. Instead, it may be desirable to retain the hotspot or at least some residual enhanced field at those locations to act as a pump for whatever material is located there because this typically determines the gain. The breakdown field for the doped material can usually be considered (if known). For fused silica the molecular vibration frequencies correspond to the 1.5-1.6 µm wavelength so that it can be important to map the bandgap width and the frequency of the mode shown in FIG. 30B in the actual PBG crystal. The structure can then be perturbed in such a way as to optimize it, e.g., to bring it to the optimal transmission band around 1.55 μm for silica as well as for Er-doped lasers.

Such a distributed (Raman) system has a number of advantages if it could be realized, but typically the pump can be at a shorter wavelength to initiate gain (excite vibrations) and the produced wavelength must also couple into the defect. If one attempts to run a waveguide(s) for the shorter wavelength pump into the hotspot(s) to insure some degree of coupling, there is the possible perturbation of the fundamental mode from the waveguide(s) depending on how one does this. Thus, embodiments relate to bringing them in only as far as one must to achieve acceptable coupling, but avoid perturbing the fundamental too much while trying to minimize the dissipation of either the injected or produced power into lattice modes.

Other means to couple power into a defect using doped capillaries include polished ends with at least the downstream end having partially transmitting end surfaces on the actively doped capillaries in combination with subsequent chamfers to refract the transmitted laser light into a downstream defect. The disposition of the doped capillaries depends on the symmetry of the crystal but this appears to provide a simpler mechanism to achieve end coupling in such PBG crystals. Other coupling schemes are associated with the defects themselves that may or may not be doped, but act as coupled defects to the original defect. Of particular interest here is that this presents another important simplification when the symmetry of the defect pattern differs from that of the lattice. In that case, fewer incident laser pulses are required to achieve high coupling efficiency and this should also have a higher degree of success not to mention safety. Since this option is less apparent and can be more complicated, it is discussed further herein.

If one wants other frequencies than mentioned above, other materials are required, e.g., in the single defect, multiple bandgap structure of FIGS. 29-30, the defect could be coated or doped or loaded in some way with other material (e.g. air) that can be driven by the coexisting 1.6 μm mode to enhance the 2.1 μm mode or others in the higher bandgaps (see FIG. 3).

For the possibility of disk phase shifters, there are again several options to consider. What is referred to as a "disk phase shifter" is an insert that has the basic fiber structure that supports an accelerating mode, but is perturbed in such a way as to increase or decrease the local effective index in the vicinity of the defect. This can be done in several ways, e.g., by introducing additional capillaries close to the defect or by changing the material there, e.g., by loading some of the existing capillary with material. The greater the change in optical properties in the vicinity of the defect, the greater the effect that is expected where the limit is determined by what the acceptable change to the fundamental or unperturbed mode might be based on the materials available for this purpose.

To see how this works, let $\beta$ represent the longitudinal propagation constant, possibly complex, for the unperturbed solution where the phase velocity is $v_p = \omega/\beta = c/n_{eff}$. It can be shown that the perturbed propagation constant is then $\underline{\beta} = \beta k \eta \delta n(x,y,z)$ where k is the free space wavenumber of the mode and $\eta$ is the overlap efficiency between the power density of the unperturbed case (Poynting vector) and the index perturbation. There are simplifying limitations for the index perturbation $\delta n(x,y,z)$ that are imposed and that are extensible. Because $n_{eff}$ is usually complex, a loss coefficient can be defined as $\alpha = 2k\, \mathrm{Im}(n_{eff})$ that defines the exponential decay of the Poynting flux with distance. If a mode's wavenumber in the fiber is $k_z$ then one has $k_z = k\, n_{eff}$ and the group velocity is:

$$V_g = d\omega/dk_z = c/(n_{eff} + \omega dn_{eff}/d\omega).$$

To maximize the mode's group velocity for a better match to that of relativistic particles, one wants to minimize both $n_{eff}$ and its derivative, e.g., by reducing the fractional amount of glass in the lattice and also making the dispersion (proportional to the second derivative) zero. Since the PBG group velocities in our examples are $v_g/c \sim 0.6$, this is matched to an electron kinetic energy of only 128 keV. While there are many important applications lying below this energy such as SEMs it may be desirable to phase slip the two beams relative to one another quite often for accelerators. The refractive index versus wavelength is shown in FIG. 32 with several variants based on loading the extra, small capillaries in FIG. 31 with different materials, e.g., gases at variable pressures and/or mixtures.

Figure 32:
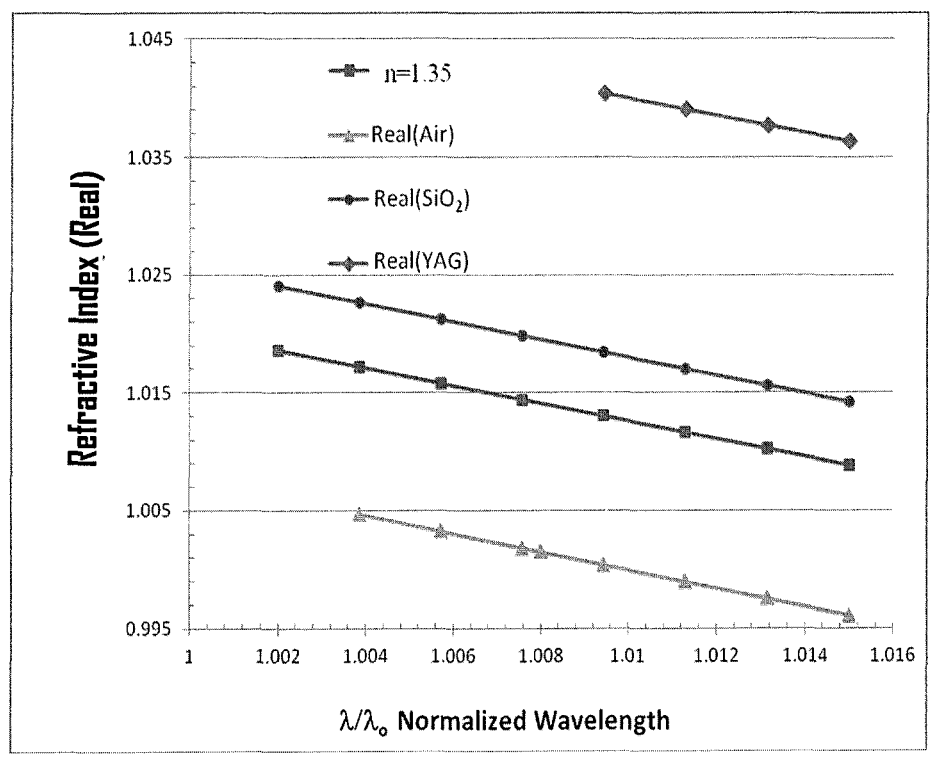
FIG. 32 shows refractive indices for the PBG crystal with six extra, very small capillaries, consistent with embodiments of the present disclosure.

FIG. 32 shows refractive indices for the PBG crystal with six extra, very small capillaries shown in FIG. 31. The index at STP for dry air is 1.008 for the base (non-optimized) structure without extra capillaries is n=1.01952 and this structure was not changed except for using the different materials as indicated. Note that doped Nd:YAG cylinders are available down to a hundred microns in lengths of a mm or more.

Figure 33:
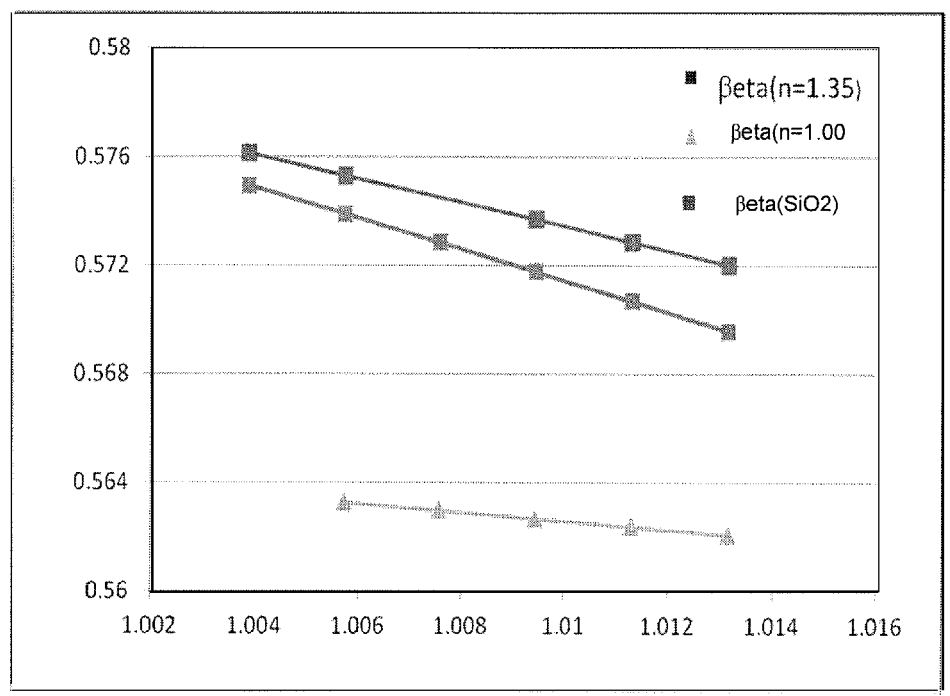
FIG. 33 shows the normalized group velocity for different cases of loading the small capillaries, consistent with embodiments of the present disclosure.

FIG. 33 shows the normalized group velocity for different cases of loading the small capillaries in FIG. 31. n=1.0 is the unloaded case (shown in green) and the blue squares are for silica w/o the holes. Because of the two terms in the denominator and their differing variations with type of material it can be difficult to make simple predictions as shown by the material for n=1.35 that is scaled from YAG.

While it has been shown that both end and side coupling are dominated by the basic crystal symmetry, it can be broken by imposing a minor array of defects such as shown in FIG. 6. FIG. 6 shows a new mode whose local distributions closely parallel those shown in FIGS. 30A-B. FIG. 7 shows the $\mathrm{Re}[E_z]$ dominated by the constructive interference between the radiative losses from the three defects excited by the same longitudinal accelerating mode as in FIGS. 30A-B. Notice that the radiation pattern no longer has a hexagonal symmetry and that the perturbations shown above can improve this by removing the two vertex capillaries and adding external rings.

The various embodiments discussed herein can be used alone and in combination. Moreover, aspects can be understood in connection with embodiments discussed in the appendix filed as part of the underlying provisional application, and which is fully incorporated herein by reference. For further details regarding data communications or particle acceleration, reference can be made to C. K. Ng et al., "*Transmission and Radiation of an Accelerating Mode in PBG*", PRSTAB 13, 121301 (2010) and J. England et al., "*Coupler Studies for PBG Fiber Accelerators*", PAC11, New York, N.Y., March 28 (2011), each of which are fully incorporated herein by reference for all they contain.

Based upon the above discussion and illustrations, those skilled in the art will readily recognize that various modifications and changes may be made to the various embodiments without strictly following the exemplary embodiments and applications illustrated and described herein. For instance, various ones of the disclosed structures and techniques for reducing and or balancing parasitic coupling may be permutations in almost unlimited numbers in various combinations. Such modifications do not depart from the true spirit and scope of various aspects of the disclosure, including aspects set forth in the claims.

What is claimed is:

1. An optical fiber waveguide comprising:
a substrate having a first dielectric constant and that includes
a lattice that includes a plurality of lattice regions having a second, different dielectric constant;
a longitudinally-extending defect in the lattice that acts with trapped transverse modes including at least one of a magnetic mode and an electric mode, the defect being configured and arranged to facilitate wave propagation along the longitudinal direction while confining the wave transversely and in which a corresponding phase velocity equals the speed of light (TM$_{SOL}$); and
a set of one or more deviations from the lattice configured and arranged to produce at least one of additional modes and coupling options for the waveguide, the deviations having physical properties that are bounded by a figure of merit.

2. The waveguide of claim 1, wherein longitudinally-extending defect acts with transverse electric modes.

3. The waveguide of claim 1, wherein the additional modes are predominantly surface type modes.

4. The waveguide of claim 3, wherein the additional modes are configured and arranged to communicate or transport data or particles using different wavelengths of light for the additional surface type modes, thereby increasing data bandwidth.

5. The waveguide of claim 4, wherein the different wavelengths of light reside in different defects.

6. The waveguide of claim 1, wherein the figure of merit includes at least one of a radius of the defect, a radius of the lattice regions, a lattice spacing between the lattice regions, a damage factor (DF), lattice symmetry, Poynting flux loss (a) and wave dispersion.

7. The waveguide of claim 1, wherein the deviations include additional regions having a different dielectric constant than the first dielectric constant and extend longitudinally.

8. The waveguide of claim 1, wherein the deviations include at least one of the lattice regions that has a smaller size, relative to other ones of the lattice regions.

9. The waveguide of claim 1, wherein the deviations include at least one of the lattice regions that has a larger size, relative to other ones of the lattice regions.

10. The waveguide of claim 1, wherein the deviations include at least two of the lattice regions having a spacing that is different than a spacing of at least two other ones of the lattice regions.

11. The waveguide of claim 1, wherein the deviations include at least one of the lattice regions that has a third dielectric constant that is different than the first and second dielectric constants.

12. The waveguide of claim 1, wherein waveguide is configured and arranged to operate as at least one of an accelerator and a transport channel, in which a phase velocity of a propagating wave therein equals the speed of light.

13. The waveguide of claim 1, wherein the defect is configured and arranged with a size that provides a trapped transverse magnetic-like mode in a bandgap for the waveguide by way of a dispersion relation that crosses a line that corresponds to a phase velocity equaling the speed of light.

14. The waveguide of claim 1, wherein the deviations include additional lattice regions that are configured and arranged to reduce hotspots in the substrate, the additional lattice regions extending longitudinally and having a dielectric constant that is different than the first dielectric constant.

15. The waveguide of claim 14, wherein the additional lattice regions include dielectric material having a higher breakdown field than the substrate and configured and arranged to act as a strong field attractor and enhance the figure of merit.

16. The waveguide of claim 1, wherein the deviations are configured and arranged to increase the transmission of power via the defect for at least one of optical and particle transmission.

17. The waveguide of claim 1, wherein the lattice regions include capillaries extending longitudinally.

18. A waveguide apparatus comprising:
a substrate having a first dielectric constant;
a plurality of lattice regions in the substrate, the lattice regions including holes in the substrate and having a second dielectric constant that is different than the first dielectric constant;
a defect region in the substrate and extending along a longitudinal direction, the defect region being configured and arranged to facilitate propagation of waves, using a trapped transverse mode, along the longitudinal direction while confining the waves transversely; and
at least one deviation region of the lattice regions, configured and arranged to provide at least one additional surface-based propagation mode for the propagation of the waves.

19. The apparatus of claim 18, wherein the defect region is configured and arranged to facilitate the propagation of the waves along the longitudinal direction with a phase velocity of the speed of light using trapped transverse modes that include at least one of a magnetic mode and an electric mode.

20. The apparatus of claim 18, wherein the lattice regions are configured and arranged with the substrate to provide a photonic crystal fiber in which modes exist in frequency passbands separated by band gaps, and to confine the propagation of the waves by confining waves having a frequency in one of the band gaps to propagation via the defect region in the trapped transverse mode.

21. For use in propagating waves via a waveguide including substrate having a first dielectric constant and that includes a lattice that includes a plurality of lattice regions having a second, different dielectric constant, a method comprising:
facilitating wave propagation along a longitudinal direction while confining the wave transversely in which a corresponding phase velocity equals the speed of light (TM$_{SOL}$), by using a longitudinally-extending defect in the lattice to provide trapped transverse modes including at least one of a magnetic mode and an electric mode; and
using a set of one or more deviations from the lattice to produce at least one of additional modes and coupling options for the waveguide, the deviations having physical properties that are bounded by a figure of merit.

22. The method of claim 21, wherein using the set of one or more deviations from the lattice to produce at least one of additional modes and coupling options includes producing additional modes that are predominantly surface type modes.

23. The method of claim 22, wherein producing additional modes includes increasing data bandwidth by communicating or transporting data or particles using different wavelengths of light for the surface type modes, using different defects having different characteristics for the respective different wavelengths of light.

* * * * *